United States Patent
Yamada

(10) Patent No.: US 9,949,221 B2
(45) Date of Patent: Apr. 17, 2018

(54) DEVICES FOR MULTI-CELL COMMUNICATIONS

(75) Inventor: Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 13/192,153

(22) Filed: Jul. 27, 2011

(65) Prior Publication Data

US 2013/0028198 A1    Jan. 31, 2013

(51) Int. Cl.
- H04W 4/00    (2009.01)
- H04W 56/00   (2009.01)
- H04W 48/20   (2009.01)

(52) U.S. Cl.
CPC ....... *H04W 56/0005* (2013.01); *H04W 48/20* (2013.01)

(58) Field of Classification Search
CPC .................. H04W 56/0005; H04W 48/20
USPC ........ 370/241, 242, 252, 328, 329, 335, 336
See application file for complete search history.

(56) References Cited

U.S. PATENT DOCUMENTS

| | | | | |
|---|---|---|---|---|
| 2009/0204862 A1* | 8/2009 | Chun | .................. | H04L 1/1822 714/748 |
| 2010/0061361 A1* | 3/2010 | Wu | .................. | H04W 56/0045 370/350 |
| 2010/0195640 A1* | 8/2010 | Park | .................. | H04W 56/0005 370/350 |
| 2010/0238908 A1* | 9/2010 | Wu | .................. | H04W 56/0005 370/336 |
| 2010/0272035 A1* | 10/2010 | Park | .................. | H04W 74/006 370/329 |
| 2010/0296467 A1* | 11/2010 | Pelletier | .............. | H04W 74/002 370/329 |
| 2011/0134774 A1* | 6/2011 | Pelletier | .............. | H04W 52/365 370/252 |
| 2011/0158116 A1* | 6/2011 | Tenny | ............... | H04W 56/0045 370/252 |
| 2011/0170535 A1* | 7/2011 | Wang | ................ | H04W 56/0045 370/350 |
| 2011/0243102 A1* | 10/2011 | Sebire | ............... | H04W 56/0045 370/336 |

(Continued)

FOREIGN PATENT DOCUMENTS

| | | | |
|---|---|---|---|
| WO | 2010/124228 | 1/2010 | |
| WO | WO 2010124228 A2 * | 10/2010 | ............ H04W 74/08 |

(Continued)

OTHER PUBLICATIONS

3GPP TS 36.321 V8.33. (2008).*

(Continued)

*Primary Examiner* — Gregory Sefcheck
*Assistant Examiner* — Jael Ulysse
(74) *Attorney, Agent, or Firm* — Austin Rapp

(57) ABSTRACT

A User Equipment (UE) configured for multi-cell communications is disclosed. The UE includes a processor and instructions stored in memory that is in electronic communication with the processor. The UE determines a primary cell (PCell) with a corresponding PCell time alignment timer. The UE also determines a secondary cell (SCell) with a corresponding SCell time alignment timer. The UE further determines whether the PCell time alignment timer is expired. The UE additionally sets the SCell time alignment timer as expired if the PCell time alignment timer is expired.

14 Claims, 15 Drawing Sheets

(56) References Cited

U.S. PATENT DOCUMENTS

| | | | |
|---|---|---|---|
| 2011/0292894 A1* | 12/2011 | Wu | H04L 1/1812 370/329 |
| 2012/0008600 A1* | 1/2012 | Marinier | H04L 5/001 370/336 |
| 2012/0082107 A1* | 4/2012 | Ou | H04W 74/0833 370/329 |
| 2012/0140743 A1* | 6/2012 | Pelletier | H04W 72/0453 370/335 |
| 2012/0182958 A1* | 7/2012 | Pelletier et al. | 370/329 |
| 2012/0243514 A1* | 9/2012 | Wu | H04W 74/0833 370/336 |
| 2012/0257570 A1* | 10/2012 | Jang | H04L 5/001 370/328 |
| 2012/0257601 A1* | 10/2012 | Kim et al. | 370/336 |
| 2012/0287865 A1* | 11/2012 | Wu | H04W 74/006 370/329 |
| 2012/0307751 A1* | 12/2012 | Dinan | 370/329 |
| 2013/0010716 A1* | 1/2013 | Dinan | H04W 76/025 370/329 |
| 2013/0016659 A1* | 1/2013 | Kone | H04W 36/0027 370/328 |
| 2013/0028204 A1* | 1/2013 | Dinan | 370/329 |
| 2013/0028239 A1* | 1/2013 | Dinan | H04W 72/0453 370/336 |

FOREIGN PATENT DOCUMENTS

| | | | |
|---|---|---|---|
| WO | 2010/148404 | 12/2010 | |
| WO | WO 2010148404 A1 * | 12/2010 | H04W 56/00 |

OTHER PUBLICATIONS

Panasonic, "Time Alignment in Case of Multiple TA" [online]. 3GPP TSG-RAN WG2 Meeting #74 R2-112819, May 9, 2011, [retrieved on Aug. 20, 2012]. Retrieved from the Internet: URL:http://www.3gpp.org/ftp/tsg_ran/WG2_RL2/TSGR2_74/Docs/R2-112819.zip.

Samsung, "Discussion on TAT Expiry" [online]. 3GPP TSG-RAN2 #71bis meeting R2-105401, Oct. 11, 2010, [retrieved on Aug. 20, 2012]. Retrieved from the Internet: URL:http://www.3gpp.org/ftp/tsg_ran/WG2_RL2/TSGR2_71bis/Docs/R2-105401.zip.

Sharp, "One TAT per TA-Group" [online]. 3GPP TSG-RAN WG2#75 R2-114097, Aug. 22, 2011, [retrieved on Aug. 20, 2012. Retrieved from the Internet: URL:http://www.3gpp.org/ftp/tsg_ran/WG2_RL2/TSGR2_75/Docs/R2-114097.zip.

NTT DoCoMo, Inc., "CA Support for Multi-TA," 3GPP TSG-RAN2 #69, R2-101567, Feb. 2010.

TSG-RAN WG4, "Reply LS on RAN2 Status on Carrier Aggregation," 3GPP TSG RAN WG2 Meeting #67bis, R2-095422, Oct. 2009.

Ericsson, ST Ericsson, "Multiple Timing Advance for Carrier Aggregation," 3GPP TSG-RAN WG2 #69, R2-101196, Feb. 2010.

3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.

3GPP TS 36.331 V9.1.0, "Evolved Universal Terrestrial Radio Access (E-UTRA) Radio Resource Control (RRC); Protocol specification (Release 9)," Dec. 2009.

3GPP TS 36.213 V8.6.0, "Evolved Universal Terrestrial Radio Access (E-UTRA) Physical layer procedures (Release 8)," Mar. 2009.

3GPP TS 36.212 V9.0.0, "Evolved Universal Terrestrial Radio Access (E-UTRA); Multiplexing and Channel Coding (Release 9)," Dec. 2009.

3GPP TS 36.211 V9.0.0, "Evolved Universal Terrestrial Radio Access (E-UTRA); Physical Channels and Modulation (Release 9)," Dec. 2009.

3GPP TS 36.321 V9.1.0, "Evolved Universal Terrestrial Radio Access (E-UTRA) Medium Access Control (MAC) protocol specification (Release 9)," Dec. 2009.

International Search Report issued for International Patent Application No. PCT/JP2012/069775 dated Sep. 10, 2012.

Renesas Mobile Europe, "Multiple timing advance using multiple RACH", 3GPP TSG-RAN WG2 Meeting #74, R2-113014, Barcelona, Spain, May 2011.

CATT, "Consideration on TA Group", 3GPP TSG RAN WG2 Meeting #74, R2-112814, Barcelona, Spain, May 2011.

* cited by examiner

US 9,949,221 B2

DEVICES FOR MULTI-CELL COMMUNICATIONS

TECHNICAL FIELD

The present disclosure relates generally to communication systems. More specifically, the present disclosure relates to devices for multi-cell communications.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed and/or quality have been sought. However, improvements in communication capacity, speed and/or quality may require increased resources.

For example, wireless communication devices may communicate with one or more devices using multiple channels or cells. However, communicating with one or more devices using multiple channels or cells may pose certain challenges. As illustrated by this discussion, systems and methods that enable or improve communication using multiple channels or cells may be beneficial.

DETAILED DESCRIPTION

Figure 1:
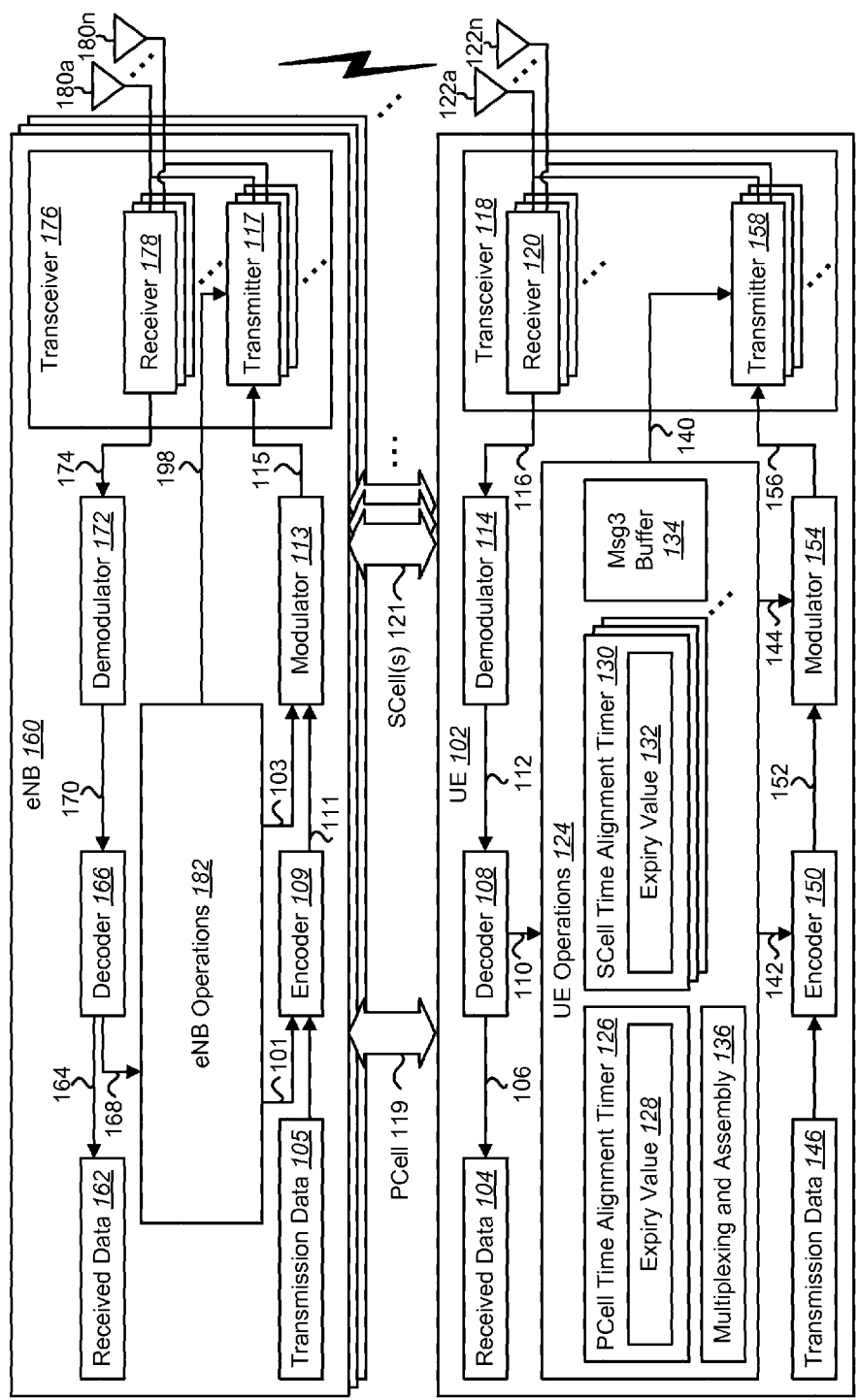
FIG. 1 is a block diagram illustrating one configuration of a user equipment (UE) and one or more evolved Node Bs (eNBs) in which systems and methods for multi-cell communications may be implemented.

A User Equipment (UE) configured for multi-cell communications is disclosed. The UE includes a processor and instructions stored in memory that is in electronic communication with the processor. The UE determines a primary cell (PCell) with a corresponding PCell time alignment timer. The UE also determines a secondary cell (SCell) with a corresponding SCell time alignment timer. The UE further determines whether the PCell time alignment timer is expired. Additionally, the UE sets the SCell time alignment timer as expired if the PCell time alignment timer is expired. The SCell time alignment timer may have an expiry value of infinity. An Msg3 buffer may not include a media access control (MAC) service data unit (SDU) in a MAC protocol data unit (PDU) for transmission in the SCell.

The UE may also determine whether the PCell time alignment timer is stopped due to an unsuccessful random access procedure. If the PCell time alignment timer is stopped due to an unsuccessful random access procedure, the UE may also maintain the SCell time alignment timer. If the PCell time alignment timer is stopped due to an unsuccessful random access procedure, the UE may additionally stop the SCell time alignment timer.

If the PCell time alignment timer is stopped due to an unsuccessful random access procedure, the UE may also stop the SCell time alignment timer. The SCell may be a designated SCell. The UE may further flush a hybrid automatic repeat request (HARQ) buffer for any other SCell that shares uplink transmission timing with the designated SCell. The UE may additionally avoid notifying radio resource control (RRC) to release a physical uplink shared channel (PUCCH) or sounding reference signal (SRS). Furthermore, the UE may clear any configured downlink assignment and any uplink grant for any other SCell that shares uplink transmission timing with the designated SCell.

If the PCell time alignment timer is stopped due to an unsuccessful random access procedure, the UE may also set as expired the SCell time alignment timer. The SCell may be a designated SCell. The UE may further flush a hybrid automatic repeat request (HARQ) buffer for any other SCell that shares uplink transmission timing with the designated SCell. The UE may additionally avoid notifying radio resource control (RRC) to release a physical uplink shared channel (PUCCH) or sounding reference signal (SRS). The UE may also clear any configured downlink assignment and any uplink grant for any other SCell that shares uplink transmission timing with the designated SCell.

A method for enabling multi-cell communications on a user equipment (UE) is also disclosed. The method includes determining a primary cell (PCell) with a corresponding PCell time alignment timer. The method also includes determining a secondary cell (SCell) with a corresponding SCell time alignment timer. The method further includes determining whether the PCell time alignment timer is expired.

The method additionally includes setting the SCell time alignment timer as expired if the PCell time alignment timer is expired.

A non-transitory, tangible computer-readable medium for enabling multi-cell communications is also disclosed. The computer-readable medium includes executable instructions for determining a primary cell (PCell) with a corresponding PCell time alignment timer. The computer-readable medium also includes executable instructions for determining a secondary cell (SCell) with a corresponding SCell time alignment timer. The computer-readable medium further includes executable instructions for determining whether the PCell time alignment timer is expired. The computer-readable medium additionally includes executable instructions for setting the SCell time alignment timer as expired if the PCell time alignment timer is expired.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced (LTE-A) standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics. For instance, a spatial characteristic of a cell may be described in terms of size.

The systems and methods disclosed herein may relate to how a user equipment (UE) behaves in case that the UE is configured for multiple timing alignment groups or multiple random access channels. In 3GPP LTE Release-10 (e.g., LTE-A or Advanced E-UTRAN), carrier aggregation is introduced. Furthermore, a primary cell (PCell) and one or more secondary cells (SCells) may be used.

The UE may adjust its uplink transmission timing for a physical uplink control channel (PUCCH), physical uplink shared channel (PUSCH) and/or sounding reference signal (SRS) of the primary cell based on a timing advance command. The timing advance command in a random access response may be transmitted from an eNB to a UE after the UE has sent a random access preamble. The timing advance command (which refers to a timing advance command media access control (MAC) control element) is also transmitted from the eNB to the UE at any time the eNB wants to change the UE's uplink transmission timing. The uplink transmission timing may need to be adjusted from time to time to account for changes in the radio frequency (RF) delay as the relative position of the UE changes in respect to a corresponding eNB. In this manner, the eNB may provide that all signals from any UEs to the eNB reach the eNB at the same time or within a cyclic prefix in an orthogonal frequency division multiplexing (OFDM) symbol.

In the case of a random access response, an 11-bit timing advance command $T_A$ may indicate $N_{TA}$ values by index values of $T_A=0, 1, 2, \ldots, 1282$, where an amount of the time alignment is given by $N_{TA}=T_A \times 16$.

In other cases, a six-bit timing advance command $T_A$ may indicate adjustment of a current $N_{TA}$ value (denoted $N_{TA,old}$) to a new $N_{TA}$ value (denoted $N_{TA,new}$) by index values of $T_A=0, 1, 2, \ldots, 63$, where $N_{TA,new}=N_{TA,old}+(T_A-31) \times 16$. In this case, adjustment of an $N_{TA}$ value by a positive or a negative amount indicates advancing or delaying the uplink transmission timing by a given amount, respectively.

Transmission of an uplink radio frame number i from the UE starts $N_{TA} \times T_s$ seconds before the start of a corresponding downlink radio frame at the UE, where $0 \leq N_{TA} \leq 20512$ and $$T_s = \frac{1}{(15000 \times 2048)}$$

seconds. In other words, a UE may begin transmitting an uplink radio frame i $N_{TA} \times T_s$ seconds before receiving a corresponding downlink radio frame i. Typically, the uplink (UL) transmission timing for a physical uplink shared channel (PUSCH) and/or sounding reference signal (SRS) of a secondary cell may be the same as that of a primary cell.

Procedures for one or more timers (e.g., time alignment timers) are described herein. In accordance with the systems and methods disclosed herein, a timer may be running once it is started, until it is stopped or until it expires. Otherwise, the timer is not running. A timer may be started if it is not running or restarted if it is running. A timer may be started or restarted from an initial value.

In one configuration of the systems and methods disclosed herein, a UE has a configurable timer, which may be referred to as a time alignment timer, "timeAlignmentTimer" or "TAT." A time alignment timer may be used to control how long a UE is considered uplink time aligned. An eNB may configure a time alignment timer expiry value (e.g., an initial value of a time alignment timer) based on UE mobility or cell size. If a UE's moving speed is quite high, a time alignment timer expiry value may be very short, since the distance between UE and eNB may change rapidly. Currently, an eNB may select a time alignment timer expiry value from 500 milliseconds (ms), 750 ms, 1280 ms, 1920 ms, 2560 ms, 5120 ms, 10240 ms or infinity.

In one configuration, a UE may operate as follows. When a timing advance command MAC control element is received, the UE may apply the timing advance command and start or restart a time alignment timer. When a timing advance command is received in a random access response message and if the random access preamble was not selected by the UE media access control (MAC), the UE may apply the timing advance command and start or restart a time alignment timer.

When a timing advance command is received in a random access response message and a time alignment timer is not running, the UE may apply the timing advance command and start the time alignment timer. In that case, when a contention resolution is considered not successful (e.g., unsuccessful), the UE may stop the time alignment timer. In other cases (e.g., the time alignment timer is running) where the timing advance command was received in a random access response message, the UE may ignore the received timing advance command.

When a time alignment timer expires, the UE may flush all HARQ buffers, notify radio resource control (RRC) to release a physical uplink control channel (PUCCH) and/or a sounding reference signal (SRS). Furthermore, the UE may clear any configured downlink assignments and uplink grants when a time alignment timer expires. It should be noted that the UE may not perform any uplink transmission except a random access preamble transmission when a time alignment timer is not running (for a corresponding cell, for example).

Multiple uplink time alignment may be needed. Aggregation between cells may be introduced with different transmission and/or reception sites. In this case, a UE may need to have different uplink transmission timing for each cell.

In Release-11, this multiple uplink transmission timing adjustment is investigated. One example of a deployment scenario is that different component carriers could see substantially different propagation environments due to different frequency selective repeaters and hence see different time-of-flights. Another example deployment scenario is that the UE may communicate with two non-collocated sites on two carriers. Such a scenario could occur with remote antennas or remote radio heads.

In Release-10, the expiry time of a time alignment timer (e.g., a "time alignment timer value" or "TAT value") is configurable and may be controlled by an eNB based on a UE's mobility or cell size. A UE's mobility may be managed only in a PCell, therefore an expiry value (e.g., TAT value) would be decided in the PCell. If an eNB provides timing advance (TA) commands for both a PCell and an SCell at the same periodicity, there may not be much difference between a TAT of the PCell and the TAT of an SCell. Therefore, an expiry value (e.g., TAT value) for an SCell could be the same as an expiry value (e.g., TAT value) for the PCell. However, the current MAC procedure for maintenance of uplink time alignment is defined based on a time alignment timer. Therefore, the procedure of an SCell for a timing advance command in a random access response message may be currently unclear if a UE only has a single time alignment timer or TAT. Especially, it may be unclear when a timing advance command for an SCell should be applied or ignored and when any uplink transmission should be prohibited.

Additionally, if a system has a random access procedure for a PCell and for an SCell, they may overlap each other. The problems caused by this overlapping of random access procedures may be alleviated or solved using the systems and methods disclosed herein.

Some of the features of one or more configurations of the systems and methods disclosed herein are given as follows. A UE may have multiple time alignment timers, where one is for a PCell and one or more other time alignment timers correspond to one or more SCell(s). One or more expiry values (e.g., TAT values) corresponding to one or more SCells may be infinity.

When a time alignment timer (TAT) of a PCell expires, a UE may also consider the time alignment timer(s) of one or more SCells as expired. When the time alignment timer (TAT) of a PCell stops (during a contention-based random access (RA) procedure, for example), a UE may maintain the time alignment timer(s) of one or more SCells. A "multiplexing and assembly" entity may not include any MAC service data units (SDU(s)) in a MAC protocol data unit (PDU) to be transmitted in a buffer (e.g., "Msg3" buffer) for an SCell.

More detail on one or more configurations of the systems and methods disclosed herein is given hereafter. In particular, more detail is given regarding one or more time alignment timers of one or more SCells that may have an infinite expiry value (e.g., an expiry value of infinity). In addition to a group of one or more serving cells that includes a PCell, one or more groups that include at least one SCell are introduced. The uplink of the one or more serving cells in each group may have the same uplink transmission timing. For example, each of one or more SCells in each group may share the same uplink transmission timing.

In one configuration, a UE has multiple time alignment timers, where one timer is for a PCell and one or more other timers are for one or more SCells. For example, there may be one time alignment timer for each group. In other words, serving cells may include a PCell having one time alignment timer and one or more SCells having one time alignment timer. One or more SCells may share the time alignment timer of a PCell or a time alignment timer of another SCell.

The UE may have multiple time alignment timers in order to handle a time advance (TA) command procedure, while not having to manage many time alignment timer expiry values. For instance, a time alignment timer corresponding to a PCell may have one expiry value, while the expiry value corresponding to one or more SCells may be infinity. The expiry value of a time alignment timer (e.g., an expiry value or "TAT value") may be controlled by an eNB based on a UE's mobility and/or cell size. A UE's mobility may be managed only in a PCell. Therefore, an expiry value (e.g., TAT value) may be decided for the PCell. Thus, the time alignment timer(s) of one or more SCells may not be required to manage when they should expire, if timing advance commands for the PCell and the SCell(s) are informed at almost the same timing. Accordingly, a time alignment timer expiry value (e.g., TAT value) for one or more SCells may be infinity. However, corresponding time alignment timer(s) may expire or stop if a time alignment timer of the PCell expires. This means that the time alignment timer expiry of an SCell may be controlled by a time alignment timer of a PCell.

This approach may reduce operational cost and/or implementation cost. In one configuration, the expiry value (e.g., TAT value) for one or more SCells may be set to infinity by a UE when the UE is configured to have uplink time alignment for an SCell. Alternatively, an expiry value (e.g., TAT value) of infinity for one or more SCells may be signaled to the UE by an eNB. When a time alignment timer of a PCell expires, the UE may consider as expired one or more time alignment timers corresponding to one or more SCells and/or may stop one or more time alignment timers corresponding to one or more SCells. However, one or more time alignment timers corresponding to one or more SCells may never expire by themselves, since they have infinity as an initial expiry value.

In one configuration, a UE may operate as follows. When a time alignment timer (TAT) of a PCell expires, the UE may flush all HARQ buffers and notify radio resource control (RRC) to release a physical uplink control channel (PUCCH) and/or a sounding reference signal (SRS). Furthermore, the UE may clear any configured downlink assignments and uplink grants and may set (e.g., consider) as expired one or more (e.g., all) time alignment timers (TATs) corresponding to one or more SCells and/or may stop one or more (e.g., all) time alignment timers corresponding to one or more SCells. In some configurations, each SCell may have at most a single time alignment timer, though one or more SCells may have a time alignment timer. It should be noted that the UE may not perform any uplink transmission on each group of one or more cells except a possible random access preamble transmission when the time alignment timer of each group is not running.

When a timing advance command MAC control element for a serving cell is received, the UE may apply the timing advance command for the concerned (e.g., corresponding) cell and start or restart a time alignment timer of the concerned cell. When a timing advance command is received in a random access response message for a serving cell and if the random access preamble was not selected by the UE MAC, the UE may apply the timing advance command for the concerned cell and start or restart a time alignment timer for the concerned cell.

When a timing advance command is received in a random access response message for a serving cell and if the time alignment timer for the concerned cell is not running, the UE may apply the timing advance command for the concerned cell and start the time alignment timer for the concerned cell. In that case, when the contention resolution is considered not successful, the UE may stop the time alignment timer for the concerned cell. In other cases (e.g., when the time alignment timer for the concerned cell is running) where the timing advance command is received in a random access response message for a serving cell, the UE may ignore the received timing advance command.

A possible mismatch between an SCell time alignment timer and a PCell time alignment timer is described as follows. After a UE sends a random access preamble, an eNB may send a timing advance command and an uplink grant value in a random access response message, which may be received by the UE. If a random access preamble is selected by a UE MAC, this may be referred to as contention based random access. If a random access preamble is not selected by a UE MAC (e.g., the random access preamble index is signaled by an eNB), this may be referred to as non-contention based random access or contention-free random access.

For a contention based random access procedure, it may be necessary to transmit a message (e.g., Msg3) and receive a contention resolution. For a non-contention based random access procedure, at the successful reception of a random access response message, the procedure may be successfully completed and the UE may perform a normal uplink transmission based on the uplink grant in the random access response.

For a contention based random access procedure, if it is the first successfully received random access response within a random access procedure, the UE may indicate to a "multiplexing and assembly" entity to include a cell radio network temporary identifier (C-RNTI) MAC control element in a subsequent uplink transmission. Furthermore, the UE may obtain a MAC PDU to transmit from the "multiplexing and assembly" entity and store it in an Msg3 buffer. A message (e.g., Msg3) stored in the Msg3 buffer may be used for a next random access attempt even if the random access preamble is retransmitted due to an unsuccessful contention resolution or unsuccessful reception of the random access response message.

If an uplink grant was received in a random access response and if it is the first successfully received random access response within a random access procedure, the UE may indicate to the "multiplexing and assembly" entity to include a C-RNTI MAC control element in a subsequent uplink transmission. Furthermore, the UE may obtain a MAC PDU to transmit from the "multiplexing and assembly" entity and store it in the Msg3 buffer.

If an uplink grant was received in a random access response and if there is a MAC PDU in the Msg3 buffer, the UE may obtain a MAC PDU to transmit from the Msg3 buffer (for contention based random access, for example). Otherwise, the UE may obtain the MAC PDU to transmit from the "multiplexing and assembly" entity (for non-contention based random access, for a normal uplink transmission based on an uplink grant received on a PDCCH, for example). It should be noted that a MAC PDU (e.g., Msg3) may be transmitted in a hybrid automatic repeat request (HARQ) process based on an uplink grant.

The UE may start a MAC contention resolution timer (e.g., "mac-ContentionResolutionTimer"). The UE may additionally restart the MAC contention resolution timer (e.g., "mac-Contention ResolutionTimer") at each HARQ retransmission, if any.

If the UE receives a specific PDCCH that is used for contention resolution, the UE may consider the contention resolution successful, stop the mac-ContentionResolution- Timer and consider the random access procedure successfully completed. If the mac-Contention ResolutionTimer expires, the UE may consider the contention resolution not unsuccessful. When the contention resolution is considered unsuccessful, the UE may stop a time alignment timer (e.g., "timeAlignmentTimer") for the concerned cell (e.g., a serving cell such as a PCell or SCell).

It should be noted that an eNB may instruct a UE to start a random access procedure for an SCell by a physical downlink control channel (PDCCH) order during a random access (RA) procedure of a PCell. After a successful random access (RA) procedure in an SCell, the "mac-ContentionResolutionTimer" of a PCell may expire and the UE will stop the time alignment timer (TAT) of the PCell. In this case, it happens the time alignment timer (TAT) of an SCell may still be running though the time alignment timer (TAT) of the PCell is not running. In this case, it may not be necessary to stop the time alignment timer (TAT) of an SCell because the time alignment (TA) of the SCell is already valid. However, a HARQ process of an SCell and one or more other SCells sharing the same uplink transmission timing would run while a HARQ process only for random access may run in the PCell. There may be two features for the time alignment timer (TAT) of the PCell, which are "to expire" and "to stop." When the time alignment timer (TAT) of a PCell expires, the UE may flush all HARQ buffers and may notify radio resource control (RRC) to release a physical uplink control channel (PUCCH) and/or sounding reference signal (SRS). Furthermore, the UE may clear any configured downlink assignments and uplink grants in this case.

When the time alignment timer (TAT) of a PCell is stopped, the UE may do nothing in response. However, actions may not be currently defined for when a time alignment timer (TAT) of an SCell expires or is stopped. In accordance with the systems and methods disclosed herein, four alternative approaches may be used.

In one approach, when the time alignment timer (TAT) of a PCell is stopped (based on an unsuccessful contention resolution during a contention based random access (RA) procedure in a PCell), the UE may maintain or keep the time alignment timer (TAT) of an SCell and may not stop the time alignment timer (TAT) of an SCell. However, when the time alignment timer (TAT) of a PCell expires, the UE may consider one or more time alignment timers (TATs) of one or more (e.g., all) SCells as expired or stop the one or more time alignment timers (TATs) of one or more (e.g., all) SCells. In some configurations, each SCell may have at most a single time alignment timer, though one or more SCells may have a time alignment timer. When a time alignment timer (TAT) of an SCell expires or is stopped, the UE may do nothing in response.

In another approach, when a time alignment timer (TAT) of a PCell is stopped (based on an unsuccessful contention resolution during a contention based random access (RA) procedure in a PCell), the UE may stop one or more time alignment timers (TATs) of one or more (e.g., all) SCells. In some configurations, a time alignment timer (TAT) of an SCell may be stopped when a mac-ContentionResolutionTimer of an SCell expires or when a mac-ContentionResolutionTimer of a PCell expires and the time alignment timer (TAT) of the PCell is stopped. However, when the time alignment timer (TAT) of the PCell expires, the UE may consider one or more time alignment timers (TATs) of one or more (e.g., all) SCells as expired or stop one or more time alignment timers (TATs) of one or more (e.g., all) SCells. When a time alignment timer (TAT) of an SCell expires or is stopped, the UE may do nothing in response.

In yet another approach, when a time alignment timer (TAT) of a PCell is stopped (based on the unsuccessful contention resolution during a contention based random access (RA) procedure in a PCell), the UE may stop one or more time alignment timers (TATs) of one or more (e.g., all) SCells. Therefore, a time alignment timer (TAT) of an SCell may be stopped when a mac-Contention ResolutionTimer of an SCell expires or when a mac-ContentionResolutionTimer of a PCell expires and the time alignment timer (TAT) of the PCell is stopped. When the time alignment timer (TAT) of an SCell is stopped, the UE may flush one or more (e.g., all) HARQ buffers for the SCell and one or more other SCells sharing the uplink transmission timing with the SCell and may avoid notifying radio resource control (RRC) to release a physical uplink control channel (PUCCH) and/or sounding reference signal (SRS). Furthermore, the UE may clear any configured downlink assignments and uplink grants for the SCell and one or more SCells sharing the uplink transmission timing with the SCell. When the time alignment timer (TAT) of the PCell expires, the UE may consider one or more time alignment timers (TATs) of one or more (e.g., all) SCells as expired.

In yet another approach, when a time alignment timer (TAT) of the PCell is stopped (based on an unsuccessful contention resolution during a contention based random access (RA) procedure in the PCell), the UE may consider one or more time alignment timers (TATs) of one or more (e.g., all) SCells as expired. When the time alignment timer (TAT) of the SCell is expired, the UE may flush one or more (e.g., all) HARQ buffers for the SCell and one or more other SCells sharing the uplink transmission timing with the SCell and may avoid notifying RRC to release a physical uplink control channel (PUCCH) and/or sounding reference signal (SRS). Furthermore, the UE may clear any configured downlink assignments and uplink grants for the SCell and one or more other SCells sharing the uplink transmission timing with the SCell. Also, when a time alignment timer (TAT) of the SCell is stopped, the UE may do nothing in response. When the time alignment timer (TAT) of the PCell expires, the UE may stop one or more time alignment timers (TATs) of one or more (e.g., all) SCells.

More detail is now given regarding an Msg3 buffer for an SCell. An eNB may request to initiate a random access procedure in an SCell during an ongoing uplink transmission in a PCell. Currently, the Msg3 buffer of a PCell may at least have a cell radio network temporary identifier (C-RNTI) MAC control element and may possibly have one or more other MAC control elements and one or more MAC service data units SDU(s). Because uplink transmission in a PCell may be resumed after a successful random access (RA) procedure, there was no problem for handling MAC SDU(s) in one time alignment in Release-10. However, if a UE performs a contention based random access procedure in an SCell and fails a random access (RA) procedure, this may cause a significant delay of MAC SDU(s) transmission compared with a normal uplink transmission in a PCell. Therefore, it may be better to not have MAC SDU(s) in an Msg3 buffer for an SCell. Thus, the "multiplexing and assembly" entity in a UE MAC may not include any MAC SDU(s) in a MAC PDU to be transmitted in an Msg3 buffer for the SCell.

Some benefits of the systems and methods disclosed herein are described as follows. One benefit may be that an eNB and a UE may operate well in a scenario that needs to have multiple uplink time alignment. Another benefit may be that an eNB may allocate resources to a UE for multiple carriers with different physical timing. Yet another benefit may be that the systems and methods disclosed herein may reduce operational cost and/or implementation cost to manage multiple time alignment timers (TATs).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a user equipment (UE) 102 and one or more evolved Node Bs (eNBs) 160 in which systems and methods for multi-cell communications may be implemented. The UE 102 communicates with an evolved Node B (eNB) 160 using one or more antennas 122a-n. For example, the UE 102 transmits electromagnetic signals to the eNB 160 and receives electromagnetic signals from the eNB 160 using the one or more antennas 122a-n. The eNB 160 communicates with the UE 102 using one or more antennas 180a-n. It should be noted that the eNB 160 may be a Node B, home evolved Node B (HeNB) or other kind of base station in some configurations.

The UE 102 and the eNB 160 may use one or more cells (e.g., channels, carrier components, etc.) 119, 121 to communicate with each other. For example, the UE 102 and eNB 160 may use the cells 119, 121 to carry one or more channels (e.g., Physical Uplink Control Channel (PUCCH), Physical Uplink Shared Channel (PUSCH), physical downlink control channel (PDCCH), etc.) A PUCCH is one example of a control channel pursuant to 3GPP specifications. Other kinds of channels may be used.

In accordance with the systems and methods disclosed herein, multiple kinds of cells 119, 121 and/or multiple groups of cells 119, 121 may be used for communication. As used herein, the term "group" may denote a group of one or more entities. A primary cell (PCell) may be a primary cell in accordance with 3GPP specifications. A secondary cell (SCell) may be a secondary cell in accordance with 3GPP specifications. One kind of group may include a PCell 119. In some cases, one or more SCells 121 may also be included in a group with a PCell 119. Another kind of group may include one or more SCells 121. As noted above, the uplink of the one or more serving cells 119, 121 in each group may have the same uplink transmission timing. For example, each of one or more SCells 121 in each group may share the same uplink transmission timing.

In one case, a single eNB 160 may communicate with the UE 102 using a PCell 119 and one or more SCells 121. In another case, one eNB 160 may communicate with the UE 102 using the PCell 119 (and optionally one or more SCells 121, for example), while another eNB 160 may communicate with the UE 102 using one or more SCells 121.

The UE 102 may include one or more transceivers 118, one or more demodulators 114, one or more decoders 108, one or more encoders 150, one or more modulators 154 and an UE operations module 124. For example, one or more reception and/or transmission paths may be used in the UE 102. For convenience, only a single transceiver 118, decoder 108, demodulator 114, encoder 150 and modulator 154 are illustrated, though multiple parallel elements (e.g., transceivers 118, decoders 108, demodulators 114, encoders 150 and modulators 154) may be used depending on the configuration.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with one or more eNBs 160 using multiple cells 119, 121. The UE operations module 124 may include a PCell time alignment timer 126, one or more SCell time alignment timers 130, a Msg3 buffer 134 and a multiplexing and assembly entity or module 136.

The PCell time alignment timer 126 may be a timer associated with the PCell 119. The PCell time alignment timer 126 may have an associated expiry value 128. The expiry value 128 indicates an amount of time (if reached) at which the PCell time alignment timer 126 expires.

Each of the one or more SCell time alignment timers 130 may correspond to one or more SCells 121. One or more of the SCell time alignment timers 130 may have an associated expiry value 132. In one configuration, the expiry value 132 of each SCell time alignment timer 130 is infinity.

In one configuration, there may be one time alignment timer 126, 130 for each group of cell(s) 119, 121. In other words, one or more cells 119, 121 may share one or more time alignment timers 126, 130. For instance, a group including the PCell 119 and optionally one or more SCells 121 may use the PCell time alignment timer 126. Furthermore, a group of one or more SCells 121 may use an SCell time alignment timer 130 (that corresponds to a designated SCell 121, for example). In another configuration, each cell 119, 121 may correspond to a separate time alignment timer 126, 130.

The expiry value 128 of the PCell time alignment timer 126 may be controlled by an eNB 160 based on the UE's 102 mobility and/or PCell 119 size. A UE's 102 mobility may be managed only in a PCell 119. Accordingly, the expiry value 128 may be determined for the PCell 119. Thus, the one or more SCell time alignment timers 130 may not be required to manage when they should expire, if timing advance commands for the PCell 119 and the SCell(s) 121 are informed at almost the same timing.

An expiry value 132 of one or more SCell time alignment timers 130 may be infinity. However, one or more corresponding SCell time alignment timers 130 may expire (e.g., be set as expired) or may be stopped if the PCell time alignment timer 126 expires. Thus, the expiration of one or more SCell time alignment timers 130 may be controlled by the PCell time alignment timer 126.

This approach may reduce operational cost and/or implementation cost. In one configuration, the expiry value 132 for one or more SCells 121 may be set to infinity by the UE 102 when the UE 102 is configured to have uplink time alignment for an SCell 121. Alternatively, the expiry value 132 of infinity for one or more SCells 121 may be signaled to the UE 102 by an eNB 160. When the PCell time alignment timer 126 expires, the UE 102 may consider or set as expired one or more SCell time alignment timers 130 and/or may stop one or more SCell time alignment timers 130. However, one or more SCell time alignment timers 130 may never expire by themselves, since they have infinity as an initial expiry value 132.

It should be noted that expiration of the PCell time alignment timer 126 (e.g., when the PCell time alignment timer 126 reaches its expiry value 128) may be different from stopping the PCell time alignment timer 126. In some configurations of the systems and methods disclosed herein, the PCell time alignment timer 126 may be stopped due to an unsuccessful random access procedure. In this case, one or more operations based on one or more SCell time alignment timers 130 may be performed.

In one approach, an SCell time alignment timer 130 may be maintained (e.g., allowed to keep running) in this case (e.g., when the PCell time alignment timer 126 is stopped due to an unsuccessful random access procedure). In another approach, an SCell time alignment timer 130 may be stopped in this case. In yet another approach, an SCell time alignment timer 130 may be set as expired in this case. In some configurations, additional operations may be performed. Greater detail is given below regarding the case where the PCell time alignment timer 126 is stopped due to an unsuccessful random access procedure.

The Msg3 buffer 134 may be one or more buffers that hold data for transmission to an eNB 160. For example, the Msg3 buffer 134 may hold a cell radio network temporary identifier (C-RNTI) MAC control element, other MAC control elements, MAC protocol data units (PDUs), other MAC service data units (SDUs) and/or other data.

In some configurations, only a single Msg3 buffer 134 may be used. In other configurations, multiple Msg3 buffers 134 may be used. For example, an Msg3 buffer 134 that corresponds to the PCell 119 may be used, while one or more additional Msg3 buffers 134 that correspond to one or more SCells 121 may be used. For example, each SCell 121 may not have more than one Msg3 buffer 134.

The multiplexing and assembly entity or module 136 may multiplex data and/or assemble the data into units for transmission. For example, the multiplexing and assembly entity or module 136 may generate MAC control elements (e.g., MAC protocol data units (PDUs)) for transmission. In some configurations, the data units generated by the multiplexing and assembly entity or module 136 may be provided to and/or stored in the Msg3 buffer(s) 134. In some configurations, the multiplexing and assembly entity or module 136 may avoid placing any MAC SDUs in a MAC PDU to be transmitted in the Msg3 buffer(s) 134 for an SCell 121. Greater detail regarding this is given below.

In some configurations, the UE 102 may determine multiple cells 119, 121. For example, the UE 102 may monitor one or more frequency bands to detect whether one or more eNBs 160 may provide access to cells 119, 121. For instance, the UE 102 may receive a broadcast, timing or beacon signal from one or more eNBs 160 indicating that the one or more eNBs 160 may provide cell(s) 119, 121 for communication. In another example, the UE 102 may transmit a signal or message to one or more eNBs 160. The one or more eNBs 160 may then send a signal in response to the UE 102 indicating that one or more cells 119, 121 may be used for communication.

In one configuration, the UE 102 may adjust its uplink transmission timing for a physical uplink control channel (PUCCH), physical uplink shared channel (PUSCH) and/or sounding reference signal (SRS) of a primary cell (PCell) 119 based on a timing advance command. The timing advance command in a random access response may be transmitted from an eNB 160 to the UE 102 after the UE 102 has sent a random access preamble. Another timing advance command (which refers to a timing advance command MAC element) may also be transmitted from an eNB 160 to the UE 102 at any time the eNB 160 wants to change the uplink transmission timing of the UE 102. The uplink transmission timing may need to be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at the same time or within a cyclic prefix in an orthogonal frequency division multiplexing (OFDM) symbol, for example.

In the case of a random access response, an 11-bit timing advance command $T_A$ may be used as described above. In other cases, a six-bit timing advance command $T_A$ may indicate adjustment of a current $N_{TA}$ value as described above.

In one configuration, the uplink transmission timing for a PUSCH and/or SRS of each SCell 121 in a group with a PCell 119 may be the same as the uplink transmission timing for the corresponding PCell 119. In accordance with the systems and methods disclosed herein, the uplink transmission timing for a PUSCH and/or SRS of each SCell 121 in a group without the PCell 119 may share the same as the uplink transmission timing (with one particular SCell 121, for example). It should be noted that each serving cell 119, 121 has a downlink and may optionally have an uplink. Furthermore, each serving downlink carrier and uplink carrier may belong to one serving cell 119, 121.

Uplink transmission timing may need to be adjusted since signals from the UE 102 may need to reach one or more eNBs 160 at one or more specified times. For example, all signals being transmitted to an eNB 160 may need to arrive at the same time or within a cyclic prefix in an OFDM symbol at the eNB 160.

A timing advance command in a random access response may be transmitted from an eNB 160 and received by the UE 102 in a PCell 119 or in a SCell 121 after the UE 102 has sent a random access preamble in the PCell 119 or the SCell 121. In one configuration, this random access response may be scheduled by a PDCCH including a random access radio network temporary identifier (RA-RNTI), which is an identifier used for scheduling a PDSCH including a random access response.

The UE operations module 124 may provide information 142 to the encoder 150. This information 142 may include instructions for the encoder 150 and/or data to be encoded. For example, the UE operations module 124 may instruct the encoder 150 to shift transmission timing for a PCell 119 and/or one or more SCells 121 and/or instruct the encoder 150 regarding an encoding rate. Additionally or alternatively, the information 142 may include data to be encoded, such as a MAC PDU, random access preamble, data from the Msg3 buffer 134, Acknowledgements or Negative Acknowledgements (ACK/NACKs) and/or other control data.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, etc. The encoder 150 may provide encoded data 152 to the modulator 154.

The UE operations module 124 may provide information 144 to the modulator 154. This information 144 may include instructions for the modulator 154. For example, the UE operations module 124 may instruct the modulator 154 to shift transmission timing for a PCell 119 and/or one or more SCells 121 and/or instruct the modulator 154 regarding a modulation type (e.g., constellation mapping). The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 to shift transmission timing for a PCell 119 and/or one or more SCells 121. The one or more transmitters 158 may upconvert and transmit the modulated signal(s) 156 to one or more eNBs 160. It should be noted that the UE 102 may need to have more than one transmitter 158 in order to perform multiple uplink timing adjustments.

Each of the one or more eNBs 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated, though multiple parallel elements (e.g., transceivers 176, decoders 166, demodulators 172, encoders 109 and modulators 113) may be used depending on the configuration.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB operations module 182 to perform one or more operations.

In general, the eNB operations module 182 may enable the eNB 160 to communicate with a UE 102 that is using one or more cells 119, 121. The eNB operations module 182 may manage the transmission timing for one or more cells 119, 121. For example, the eNB operations module 182 may send a timing adjustment message (e.g., timing advance command) to the UE 102 to adjust the transmission timing for one or more cells 119, 121. For instance, the UE 102 may advance or delay the timing of signals transmitted from the UE 102 corresponding to an eNB 160 based on one or more timing advance commands sent from the eNB 160. The transmission timing may be different between cells 119, 121 (e.g., between groups of cells 119, 121).

In one configuration, the UE 102 may adjust its uplink transmission timing for a physical uplink control channel (PUCCH), physical uplink shared channel (PUSCH) and/or sounding reference signal (SRS) of a primary cell (PCell) 119 based on a timing advance command (e.g., message) from an eNB 160. The timing advance command in a random access response may be transmitted from an eNB 160 to the UE 102 after the UE 102 has sent a random access preamble (to the eNB 160). Another timing advance command (which refers to a timing advance command MAC element) is also transmitted from an eNB 160 to the UE 102 at any time the eNB 160 wants to change the uplink transmission timing of the UE 102. The uplink transmission timing may need to be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at the same time or within a cyclic prefix in an orthogonal frequency division multiplexing (OFDM) symbol, for example In the case of a random access response, an 11-bit timing advance command $T_A$ may be sent from the eNB 160 as described above. In other cases, a six-bit timing advance command $T_A$ may be sent from the eNB 160 and may indicate adjustment of a current $N_{TA}$ value as described above.

A timing advance command in a random access response may be transmitted from an eNB 160 and received by the UE 102 in a PCell 119 or in an SCell 121 after the UE 102 has sent a random access preamble in the PCell 119 or the SCell 121. This random access response may be scheduled by a PDCCH including a random access radio network temporary identifier (RA-RNTI), which is an identifier used for scheduling a PDSCH including a random access response. In some configurations, the PCell 119 or SCell 121 that a random access response is for may be indicated by which serving cell 119, 121 the random access response is scheduled in. A serving cell that the random access response is scheduled in may be indicated by a cell 119, 121 that has a HARQ entity, a PDCCH or a PDSCH for a random access response.

Another timing advance command (e.g., a timing advance command MAC element) may be transmitted from an eNB 160 to the UE 102 at any time an eNB 160 wants to change the UE's 102 uplink transmission timing. Whether the received timing advance command is for the PCell 119 or for an SCell 121 may be indicated based on which serving cell 119, 121 the timing advance command is scheduled in. For example, which cell 119, 121 a timing advance command is for may be indicated by a cell that has a HARQ entity, a PDCCH or a PDSCH for a timing advance command.

The eNB operations module 182 may provide information 101 to the encoder 109. This information 101 may include instructions for the encoder 109 and/or data to be encoded. For example, the eNB operations module 182 may instruct the encoder 109 regarding an encoding rate. Additionally or alternatively, the information 101 may include data to be encoded, such as a message indicating a timing advance command, scheduling information, channel allocations and/or other control information.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may instruct the modulator 113 regarding a modulation type (e.g., constellation mapping). The modulator 113 may modulate the encoded data 111 to provide one or more modulated signals 115 to the one or more transmitters 117.

The eNB operations module 182 may provide information 198 to the one or more transmitters 117. This information 198 may include instructions for the one or more transmitters 117. For example, the eNB operations module 182 may instruct the one or more transmitters 117 to transmit using one or more cells 119, 121. The one or more transmitters 117 may upconvert and transmit the modulated signal(s) 115 to the UE 102.

Figure 2:
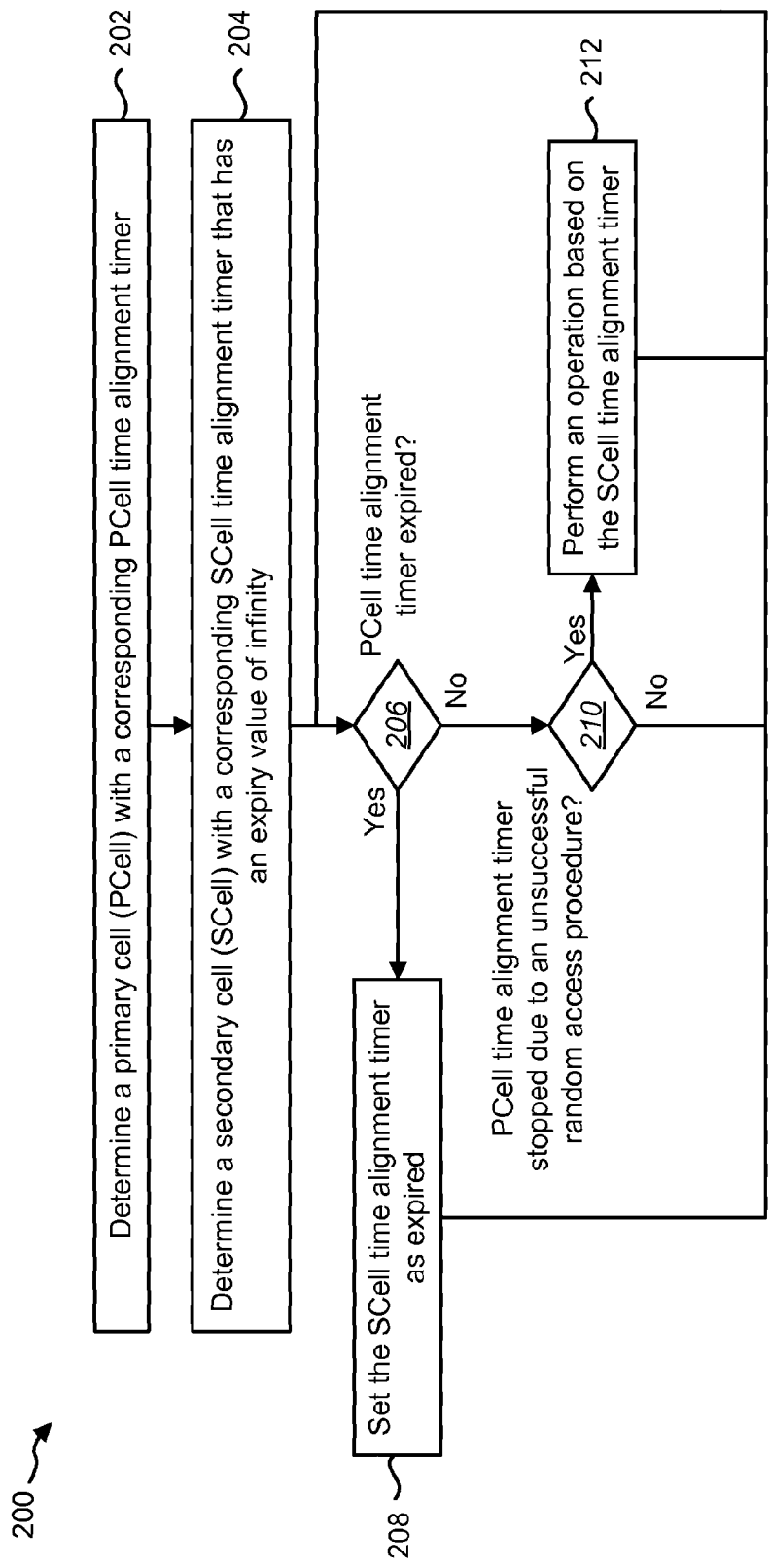
FIG. 2 is a flow diagram illustrating one configuration of a method for enabling multi-cell communications on a user equipment (UE)

FIG. 2 is a flow diagram illustrating one configuration of a method 200 for enabling multi-cell communications on a UE 102. A UE 102 may determine 202 a primary cell (PCell) 119 with a corresponding PCell time alignment timer 126. For example, the UE 102 may receive a synchronization signal, a beacon, a message, etc., from one or more eNBs 160 indicating that a PCell 119 may be used for communications. An eNB 160 may additionally send a message that configures an expiry value 128 for the PCell 119. For example, the UE 102 may receive a message from an eNB 160 that indicates an expiry value 128 (e.g., 500 ms, 750 ms, 1280 ms, 1920 ms, 2560 ms, 5120 ms, 10240 ms or infinity) for a PCell 119. Additionally or alternatively, the UE 102 may send a signal or message (e.g., an access request, authentication information, etc.) to one or more eNBs 160 indicating that the UE 102 is seeking to communicate with the one or more eNBs 160. In this case, the one or more eNBs 160 may respond by sending a signal that allows the UE 102 to communicate with the one or more eNBs 160 using a PCell 119.

The UE 102 may determine 204 a secondary cell (SCell) 121 with a corresponding SCell time alignment timer 130 that has an expiry value 132 of infinity. In one configuration, the expiry value 132 for one or more SCells 121 may be set to infinity by the UE 102 when the UE 102 is configured to have uplink time alignment for an SCell 121. Alternatively, an expiry value 132 of infinity for one or more SCells 121 may be signaled to the UE 102 by one or more eNBs 160.

The UE 102 may determine 206 whether a PCell time alignment timer 126 has expired. For example, the UE 102 may determine whether a time amount indicated by the PCell time alignment timer 126 has met or exceeded the expiry value 128 associated with the PCell time alignment timer 126.

If the PCell time alignment timer 126 has expired, the UE 102 may set 208 the SCell time alignment timer 130 as expired. For example, the UE 102 may set 208 the SCell time alignment timer 130 into a non-running state. In some configurations, the UE 102 may set 208 one or more (e.g., all) SCell time alignment timers 130 as expired if the PCell time alignment timer 126 has expired.

If the PCell time alignment timer 126 has not expired, the UE 102 may determine 210 whether the PCell time alignment timer 126 has stopped due to an unsuccessful random access procedure. For example, if a mac-Contention ResolutionTimer for the PCell 119 has expired, then the UE 102 may stop the PCell time alignment timer 126 due to an unsuccessful random access procedure. In this case, the UE 102 may perform 212 an operation based on an SCell time alignment timer 130. In some configurations, the UE 102 may perform 212 an operation based on multiple SCell time alignment timers 130. One or more operations may be performed 212. Examples are given in further detail below.

UE 102 operation may eventually return to determining 206 whether the PCell time alignment timer 126 has expired (if the PCell time alignment timer has not stopped due to an unsuccessful random access procedure, after setting 208 the SCell time alignment timer 130 as expired or after performing 212 an operation based on the SCell time alignment timer 130, for example). It should be noted that the steps illustrated in FIG. 2 may be performed in differing orders depending on the configuration. In an alternative configuration, for example, the UE 102 may first determine 210 whether the PCell time alignment timer 126 has stopped due to an unsuccessful random access procedure and then, if the PCell time alignment timer 126 has not, the UE 102 may determine 206 whether the PCell time alignment timer 126 has expired. In yet another alternative, these determinations 206, 210 may be based on a trigger that is not necessarily performed sequentially.

Figure 3:
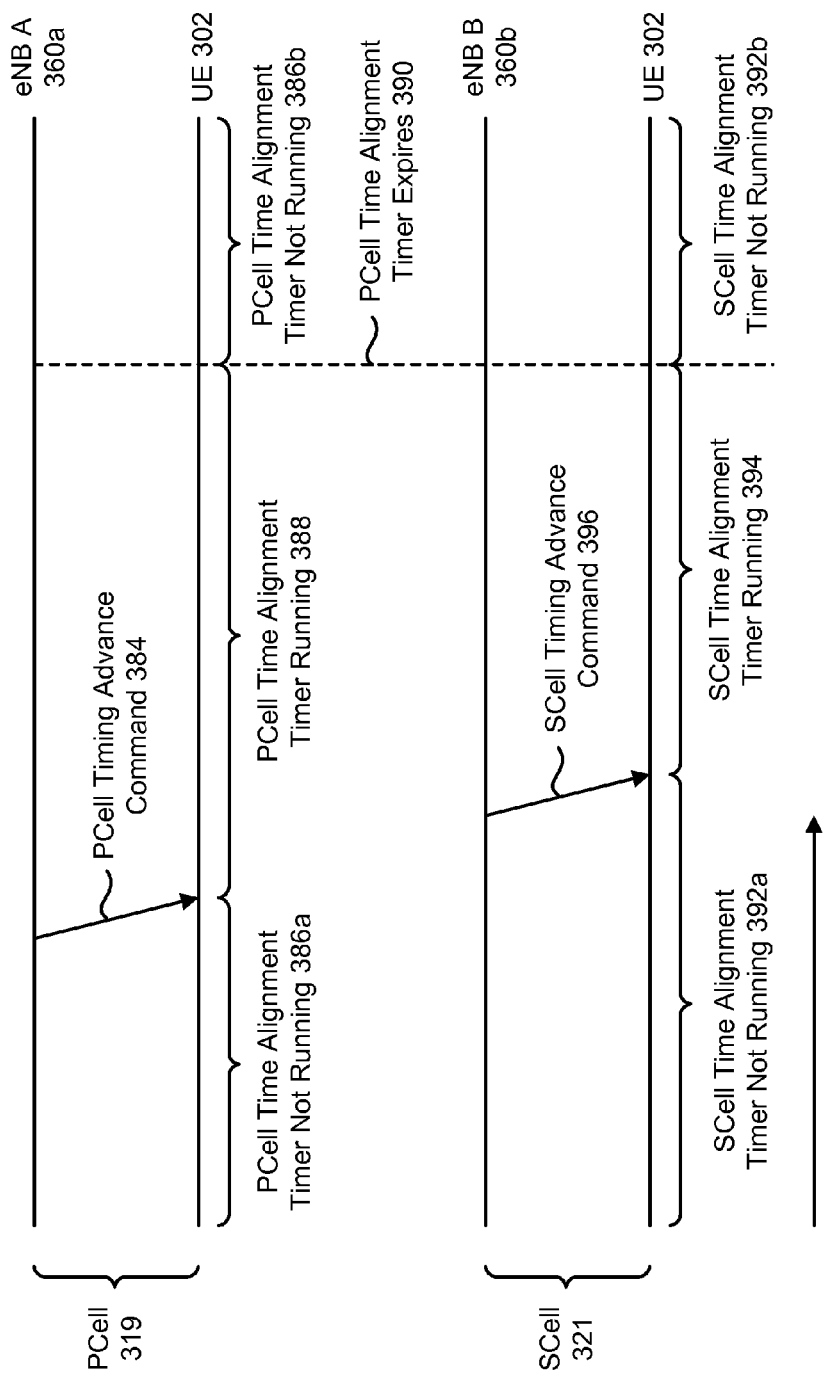
FIG. 3 is a diagram illustrating one example of controlling a secondary cell (SCell) time alignment timer based on the expiration of a primary cell (PCell) time alignment timer.

FIG. 3 is a diagram illustrating one example of controlling an SCell time alignment timer based on the expiration of a PCell time alignment timer. In particular, FIG. 3 illustrates one example of PCell 319 activities and SCell 321 activities on a UE 302 over time 338. In this example, a PCell time alignment timer is not running 386a initially and an SCell time alignment timer is not running 392a initially. The UE 302 may communicate with one or more eNBs 360a-b. It should be noted that eNB A 360a and eNB B 360b may be the same eNB or may be different eNBs.

The UE 302 may receive a PCell timing advance command 384 from eNB A 360a in a PCell 319. When this occurs, the UE 302 may start a PCell time alignment timer, such that the PCell time alignment timer is running 388. In this example, the UE 302 also receives an SCell timing advance command 396 from eNB B 360b in an SCell 321. When this occurs, the UE 302 may start an SCell time alignment timer, such that the SCell time alignment timer is running 394.

In this example, the PCell time alignment timer continues running 388 and the SCell time alignment timer continues running 394 until the PCell time alignment timer expires 390. The PCell time alignment timer may expire 390 when an expiry value of the PCell time alignment timer is reached. At this point, the PCell time alignment timer is not running 386b. The UE 302 may set as expired the SCell time alignment timer upon the expiration 390 of the PCell time alignment timer. The SCell time alignment timer is then not running 392*b*. In accordance with the systems and methods herein one or more SCell time alignment timers may have an expiry value of infinity, and may expire instead when triggered by the expiration 390 of the PCell time alignment timer as illustrated in FIG. 3.

Figure 4:
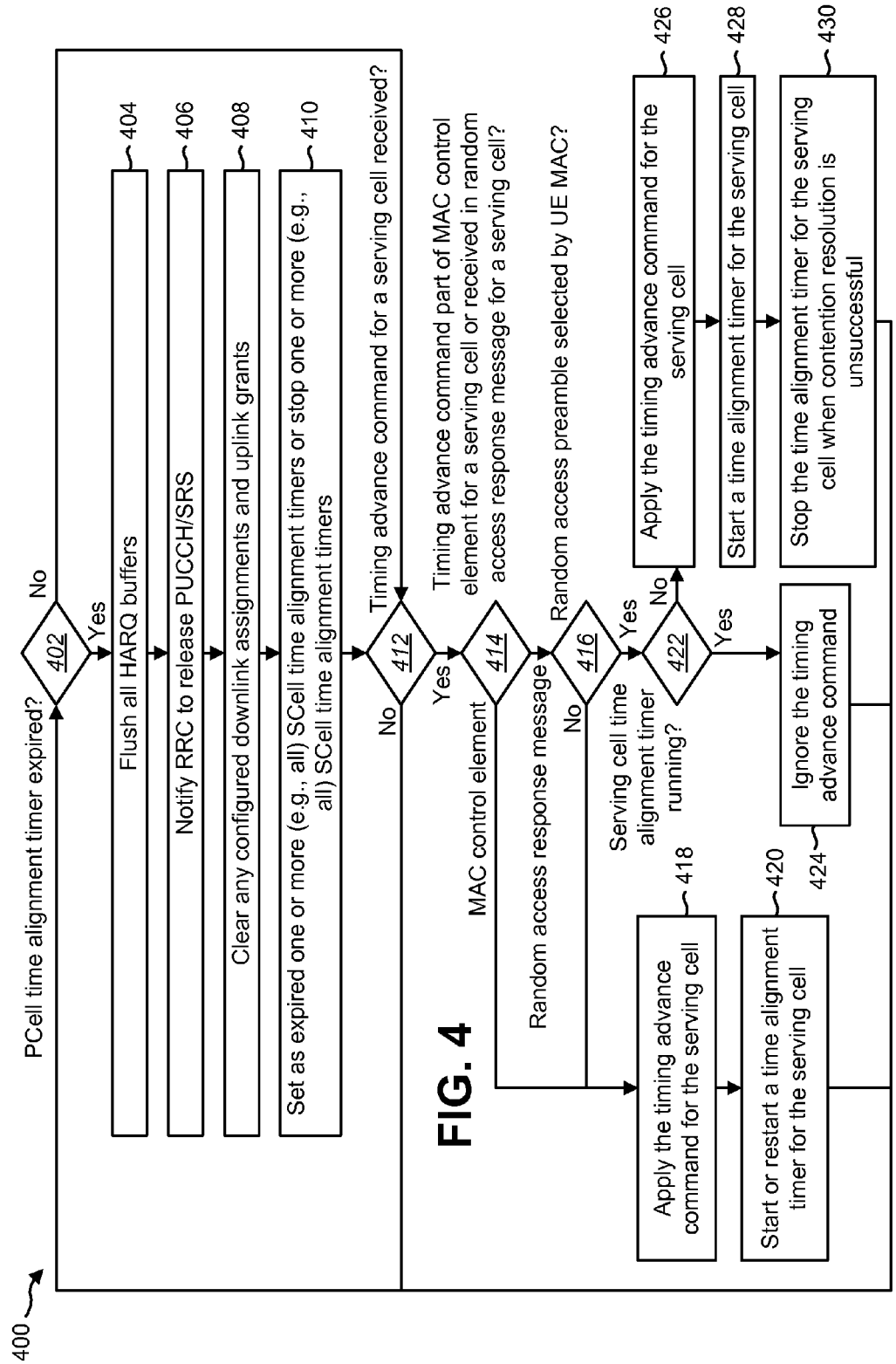
FIG. 4 is a flow diagram illustrating a more specific configuration of a method for enabling multi-cell communications on a user equipment (UE)

FIG. 4 is a flow diagram illustrating a more specific configuration of a method 400 for enabling multi-cell communications on a UE 102. As described above, a UE 102 may have multiple time alignment timers 126, 130 in order to handle a time advance (TA) command procedure. The expiry value 128, 132 of a time alignment timer 126, 130 may be controlled by one or more eNBs 160 based on a UE's 102 mobility and/or cell 119, 121 size. A UE's 102 mobility may be managed only in a PCell 119. Therefore, an expiry value 128 may be decided for the PCell 119. Thus, the SCell time alignment timer(s) 130 may not be required to manage when they should expire, if timing advance commands for the PCell 119 and the SCell(s) 121 are informed at almost the same timing. Accordingly, a time alignment timer expiry value 132 for one or more SCells 121 may be infinity. However, corresponding time alignment timer(s) 130 may expire or stop if the PCell time alignment timer 126 expires. This means that the time alignment timer expiry of an SCell 121 may be controlled by the PCell time alignment timer 126.

This approach may reduce operational cost and/or implementation cost. In one configuration, the expiry value 132 for one or more SCells 121 may be set to infinity by the UE 102 when the UE 102 is configured to have uplink time alignment for an SCell 121. Alternatively, an expiry value 132 of infinity for one or more SCells 121 may be signaled to the UE 102 by an eNB 160. When the PCell time alignment timer 126 expires, the UE 102 may set as expired one or more SCell time alignment timers 130 and/or may stop one or more SCell time alignment timers 130. However, one or more SCell time alignment timers 130 may never expire by themselves, since they may have infinity as an initial expiry value 132.

In one configuration, a UE 102 may operate as follows. The UE 102 may determine 402 whether a PCell time alignment timer 126 has expired. If the PCell time alignment timer 126 has not expired, the UE 102 may determine 412 whether a timing advance command for a serving cell is received. However, when the PCell time alignment timer 126 expires, the UE 102 may flush 404 all HARQ buffers and notify 406 radio resource control (RRC) to release a physical uplink control channel (PUCCH) and/or a sounding reference signal (SRS). Furthermore, the UE 102 may clear 408 any configured downlink assignments and uplink grants.

The UE 102 may set 410 as expired one or more (e.g., all) SCell time alignment timers 130 or may stop 410 one or more (e.g., all) SCell time alignment timers 130. It should be noted that the UE 102 may not perform any uplink transmission on each group of one or more cells 119, 121 except a possible random access preamble transmission when the time alignment timer 126 of each group is not running.

The UE 102 may determine 412 whether a timing advance command for a serving cell (e.g., PCell 119 or SCell 121) is received. If a timing advance command is not received, the UE 102 may return to determine 402 whether the PCell time alignment timer 126 is expired. If a timing advance command for a serving cell is received, the UE 102 may determine 414 whether the timing advance command is part of a MAC control element for the serving cell or whether the timing advance command is received in a random access response message for the serving cell.

If the timing advance command is part of a MAC control element for the serving cell, the UE 102 may apply 418 the timing advance command for the serving cell. The UE 102 may also start or restart 420 a time alignment timer 126, 130 for the serving cell. The UE 102 may return to determining 402 whether the PCell time alignment timer 126 has expired.

If the timing advance command is received in a random access response message, the UE 102 may determine 416 whether a random access preamble was selected by the UE 102 MAC. If the random access preamble was not selected by the UE 102 MAC, the UE 102 may apply 418 the timing advance command for the serving cell 119, 121 and start or restart 420 a time alignment timer 126, 130 for the serving cell 119, 121.

If the random access response was selected by the UE 102 MAC, the UE 102 may determine 422 whether a serving cell time alignment timer 126, 130 is running. If the time alignment timer 126, 130 for the serving cell 119, 121 is not running, the UE 102 may apply 426 the timing advance command for the serving cell and start 428 the time alignment timer 126, 130 for the serving cell 119, 121. Furthermore, the UE 102 may stop 430 the time alignment timer 126, 130 for the serving cell 119, 121 when a contention resolution procedure (e.g., random access procedure) is unsuccessful. In other cases (e.g., the time alignment timer is running), the UE 102 may ignore 424 the received timing advance command.

In the case that the UE 102 stops 430 the PCell time alignment timer 126 for the PCell 119 due to an unsuccessful contention resolution or random access procedure, the UE 102 may perform an operation based on an SCell time alignment timer in some configurations. This may be done as described in step 212 of FIG. 2 and/or according to one or more examples given in connection with FIG. 5 and FIG. 6 below.

The UE 102 may return to determining 402 whether the PCell time alignment timer has expired. It should be noted that the steps illustrated in FIG. 4 may be performed in differing orders depending on the configuration. In an alternative configuration, for example, the UE 102 may first perform step 412 (and optionally steps 414, 416, 418, 420, 422, 424, 426, 428 and/or 430) and then may perform step 402 (and optionally steps 404, 406, 408 and/or 410). In yet another alternative, these determinations 402, 412 and/or other steps may be performed based on one or more triggers that are not necessarily performed sequentially.

Figure 5:
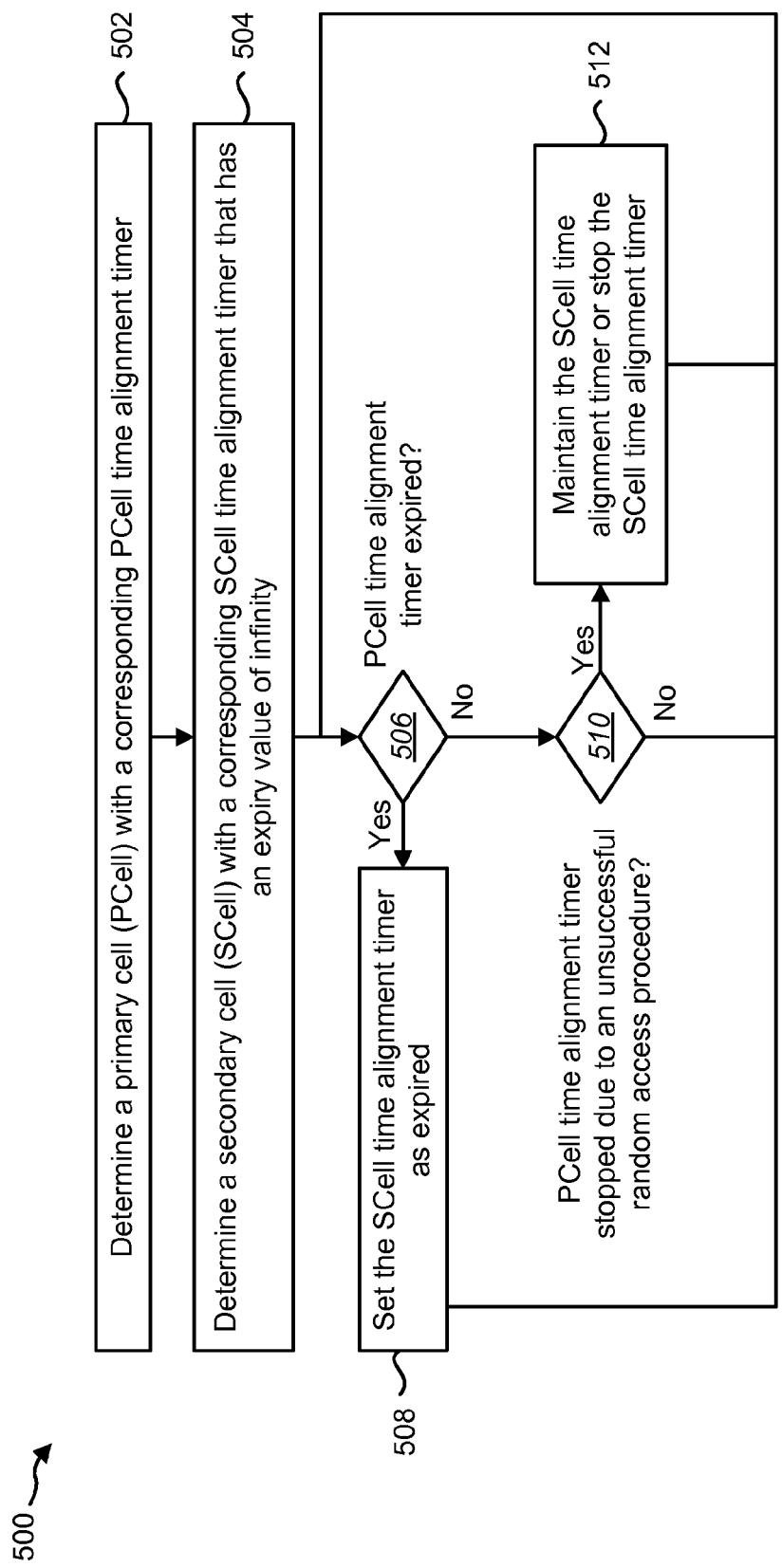
FIG. 5 is a flow diagram illustrating examples of a method for enabling multi-cell communications on a user equipment (UE)

FIG. 5 is a flow diagram illustrating examples of a method 500 for enabling multi-cell communications on a UE 102. A UE 102 may determine 502 a primary cell (PCell) 119 with a corresponding PCell time alignment timer 126. For example, the UE 102 may receive a synchronization signal, a beacon, a message, etc., from one or more eNBs 160 indicating that a PCell 119 may be used for communications. An eNB 160 may additionally send a message that configures an expiry value 128 for the PCell 119. For example, the UE 102 may receive a message from an eNB 160 that indicates an expiry value 128 (e.g., 500 ms, 750 ms, 1280 ms, 1920 ms, 2560 ms, 5120 ms, 10240 ms or infinity) for a PCell 119. Additionally or alternatively, the UE 102 may send a signal or message (e.g., an access request, authentication information, etc.) to one or more eNBs 160 indicating that the UE 102 is seeking to communicate with the one or more eNBs 160. In this case, the one or more eNBs 160 may respond by sending a signal that allows the UE 102 to communicate with the one or more eNBs 160 using a PCell 119.

The UE 102 may determine 504 a secondary cell (SCell) 121 with a corresponding SCell time alignment timer 130 that has an expiry value 132 of infinity. In one configuration, the expiry value 132 for one or more SCells 121 may be set to infinity by the UE 102 when the UE 102 is configured to have uplink time alignment for an SCell 121. Alternatively, an expiry value 132 of infinity for one or more SCells 121 may be signaled to the UE 102 by one or more eNBs 160.

The UE 102 may determine 506 whether a PCell time alignment timer 126 has expired. For example, the UE 102 may determine whether a time amount indicated by the PCell time alignment timer 126 has met or exceeded the expiry value 128 associated with the PCell time alignment timer 126.

If the PCell time alignment timer 126 has expired, the UE 102 may set 508 the SCell time alignment timer 130 as expired. For example, the UE 102 may set 508 the SCell time alignment timer 130 into a non-running state. In some configurations, the UE 102 may set 508 one or more (e.g., all) SCell time alignment timers 130 as expired if the PCell time alignment timer 126 has expired.

If the PCell time alignment timer 126 has not expired, the UE 102 may determine 510 whether the PCell time alignment timer 126 has stopped due to an unsuccessful random access procedure. For example, if a mac-Contention ResolutionTimer for the PCell 119 has expired, then the UE 102 may stop the PCell time alignment timer 126 due to an unsuccessful random access procedure. In this case, the UE 102 may perform an operation based on an SCell time alignment timer 130. In one configuration, the UE 102 may maintain 512 the SCell time alignment timer 130. For example, the UE 102 may allow one or more SCell time alignment timers 130 to continue running. In an alternative configuration, the UE may stop 512 the SCell time alignment timer 130 in this case. For instance, the UE 102 may stop 512 one or more SCell time alignment timers 130.

UE 102 operation may eventually return to determining 506 whether the PCell time alignment timer 126 has expired (if the PCell time alignment timer 126 has not stopped due to an unsuccessful random access procedure, after setting 508 the SCell time alignment timer 130 as expired or after maintaining 512 or stopping 512 the SCell time alignment timer 130, for example). It should be noted that the steps illustrated in FIG. 5 may be performed in differing orders depending on the configuration. In an alternative configuration, for example, the UE 102 may first determine 510 whether the PCell time alignment timer 126 has stopped due to an unsuccessful random access procedure and then, if the PCell time alignment timer 126 has not, the UE 102 may determine 506 whether the PCell time alignment timer 126 has expired. In yet another alternative, these determinations 506, 510 may be based on a trigger that is not necessarily performed sequentially.

Figure 6:
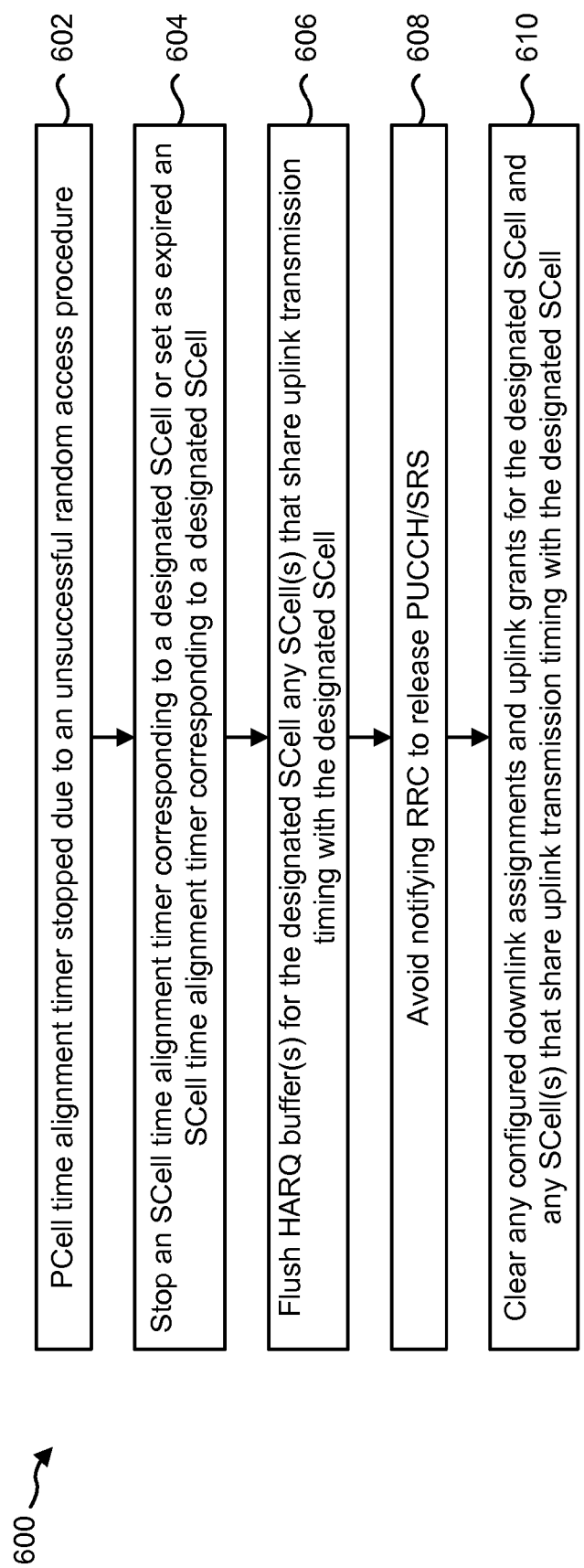
FIG. 6 is a flow diagram illustrating examples of a method for performing an operation based on a secondary cell (SCell) time alignment timer.

FIG. 6 is a flow diagram illustrating examples of a method 600 for performing an operation based on an SCell time alignment timer 130. More specifically, FIG. 6 illustrates examples of performing 212 an operation based on an SCell time alignment timer as illustrated in FIG. 2. A PCell time alignment timer 126 may be stopped 602 due to an unsuccessful random access procedure. For example, a UE 102 may determine 210 that the PCell time alignment timer 126 has stopped due to an unsuccessful random access procedure as illustrated in FIG. 2.

In one configuration, the UE 102 may stop 604 an SCell time alignment timer 130 corresponding to a designated SCell 121. In one example, one or more SCells 121 may share uplink transmission timing with a designated SCell 121 (e.g., a "primary secondary cell" or "PSCell"). For instance, the uplink transmission timing of the designated SCell 121 may be used by one or more other SCells 121 in a group. In another configuration, the UE 102 may set 604 as expired an SCell time alignment timer 130 corresponding to a designated SCell 121.

The UE 102 may flush 606 one or more (e.g., all) HARQ buffers for the designated SCell 121 and any SCells 121 that share uplink transmission timing with the designated SCell 121. For example, the UE 102 may flush 606 all HARQ buffers for SCells 121 in a group with the designated SCell 121. The UE 102 may also avoid notifying 608 radio resource control (RRC) to release a physical uplink control channel (PUCCH) and/or sounding reference signal (SRS). For example, the UE 102 may not notify 608 RRC to release a PUCCH and/or SRS.

The UE 102 may clear 610 any configured downlink assignments and uplink grants for the designated SCell 121 and any SCells 121 that share uplink transmission timing with the designated SCell 121. For example, the UE 102 may clear 610 any configured downlink assignments and uplink grants for one or more SCells 121 in a group with the designated SCell 121.

Figure 7:
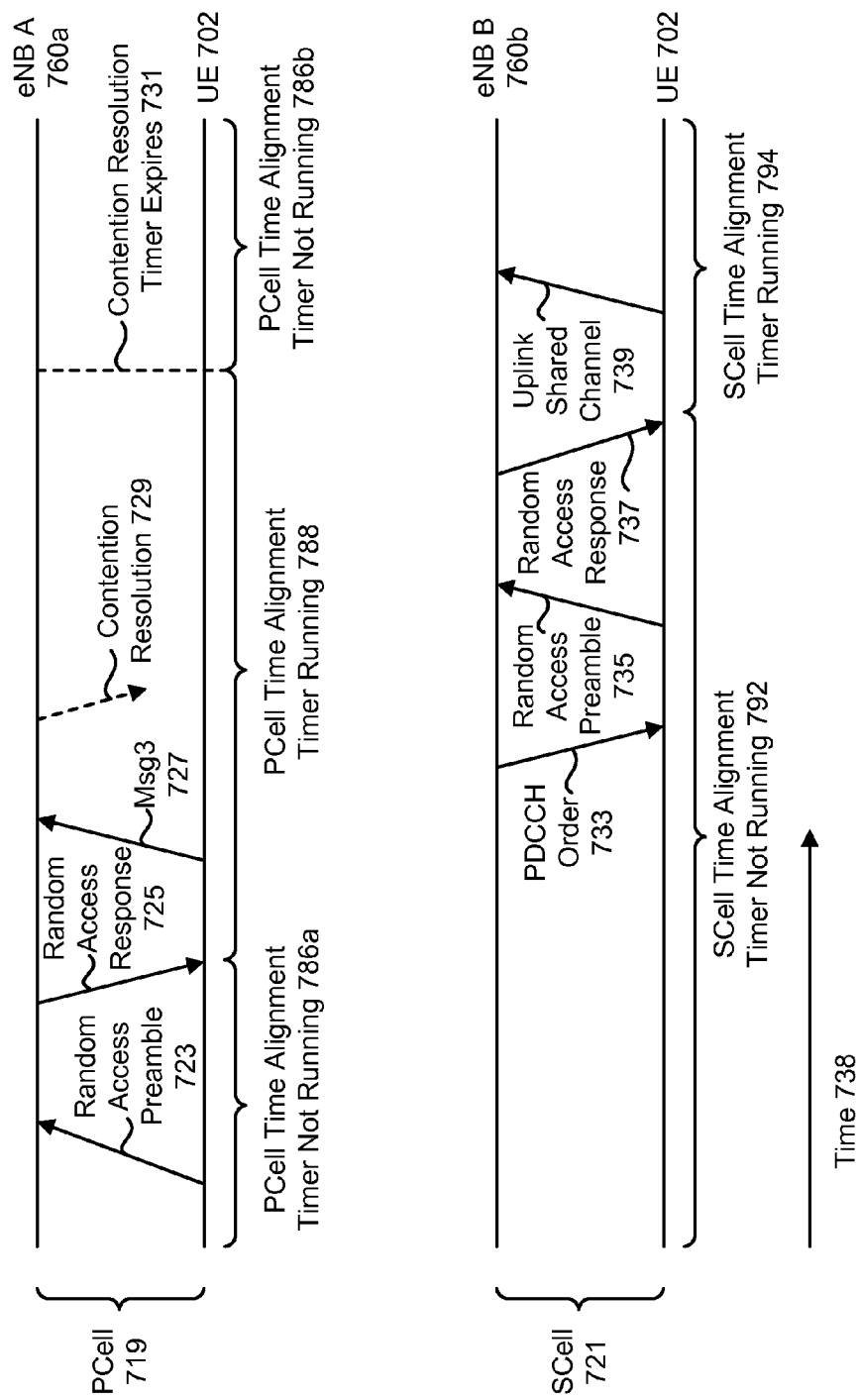
FIG. 7 is a diagram illustrating one example of a mismatch between a secondary cell (SCell) time alignment timer and a primary cell (PCell) time alignment timer.

FIG. 7 is a diagram illustrating one example of a mismatch between an SCell time alignment timer 130 and a PCell time alignment timer 126. In particular, FIG. 7 illustrates one example of PCell 719 activities and SCell 721 activities on a UE 702 over time 738. In this example, a PCell time alignment timer is not running 786a initially and an SCell time alignment timer is not running 792 initially. The UE 702 may communicate with one or more eNBs 760a-b. It should be noted that eNB A 760a and eNB B 760b may be the same eNB or may be different eNBs.

The UE 702 may send a random access preamble 723 to eNB A 760a in a PCell 719. The UE 702 may then receive a random access response 725 from eNB A 760a. When this occurs, the UE 702 may start a PCell time alignment timer, such that the PCell time alignment timer is running 788. In some cases (e.g., in a contention based random access procedure), the UE 702 may transmit a Msg3 727 to eNB A 760a for contention resolution.

In this example, eNB A 760a may attempt to send a contention resolution message 729. However, the UE 702 may not receive the contention resolution message 729. Alternatively, eNB A 760a may not send a contention resolution message 729. Eventually, a contention resolution timer (e.g., mac-Contention ResolutionTimer) expires 731. At this point, the UE 702 may stop the PCell time alignment timer such that the PCell time alignment timer is not running 786b. Thus, the PCell time alignment timer may be stopped due to an unsuccessful random access procedure (e.g., unsuccessful contention resolution). More detail is given below.

In this example, an SCell time alignment timer is not running 792 initially on the UE 702. The UE 702 receives a PDCCH order 733 in an SCell 721 from eNB B 760b to begin a random access procedure. Accordingly, the UE 702 may send a random access preamble 735 to eNB B 760b. Upon receiving a random access response 737 from eNB B 760b, the UE 702 may start the SCell time alignment timer such that the SCell time alignment timer is running 794. The UE 702 may then transmit data to eNB B 760b using an uplink shared channel (UL-SCH) 739.

As illustrated by the example shown in FIG. 7, eNB B 760b may instruct the UE 702 to start a random access procedure for an SCell 721 by a physical downlink control channel (PDCCH) order 733 while a random access (RA)

procedure is ongoing in a PCell 719. After a successful random access (RA) procedure in the SCell 721, the contention resolution timer (e.g., "mac-ContentionResolution-Timer") of the PCell 719 may expire 731 and the UE 702 may stop the PCell time alignment timer. In this case, the SCell time alignment timer may still be running 794, even though the PCell time alignment timer is not running 786b. In this case, it may not be necessary to stop the SCell time alignment timer, because the time alignment (TA) of the SCell is already valid.

Figure 8:
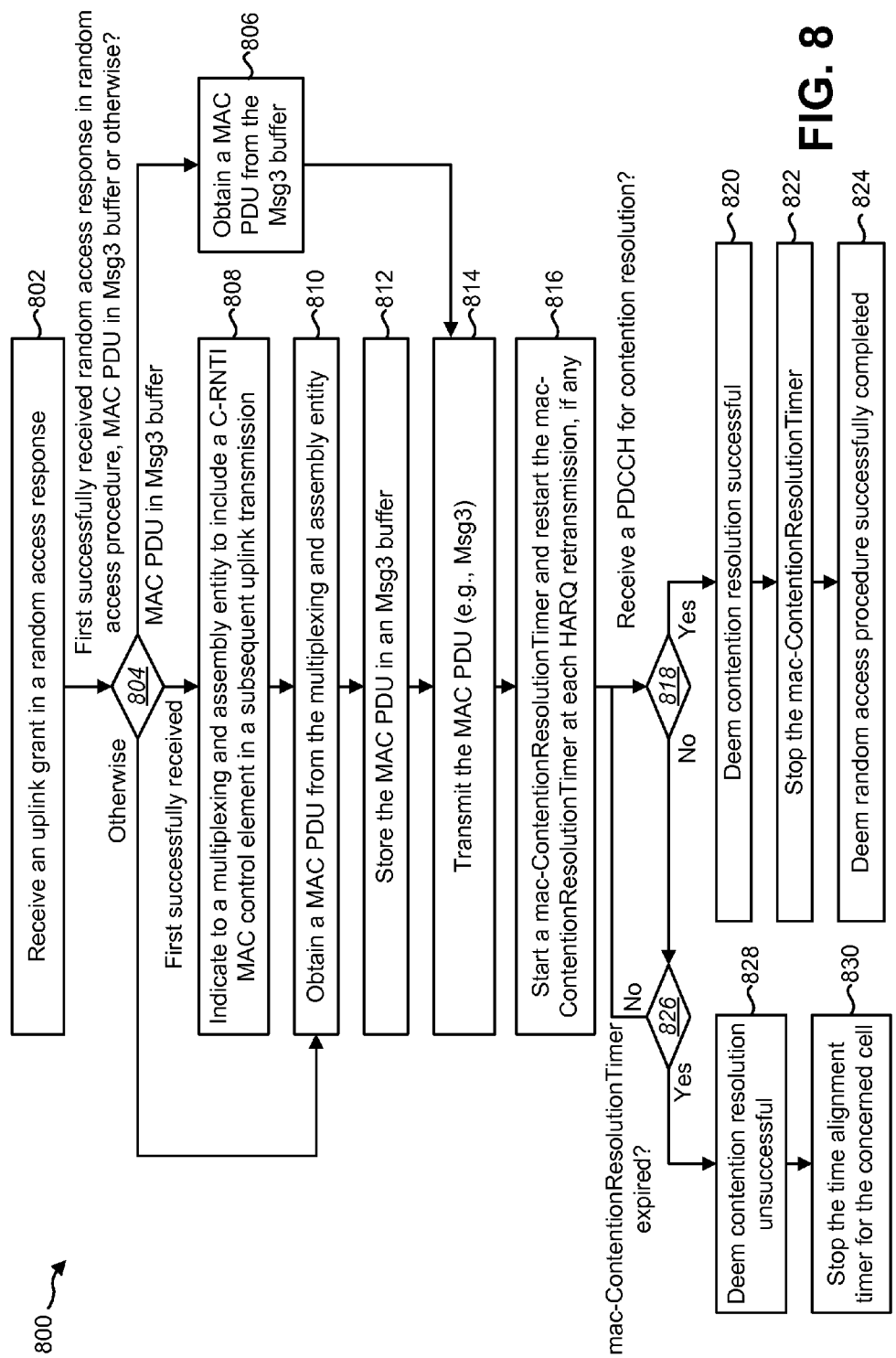
FIG. 8 is a flow diagram illustrating one example of a method for handling a random access response.

However, a HARQ process of the SCell 721 and one or more other SCells sharing the same uplink transmission timing may run while a HARQ process only for random access may run in the PCell 719. There may be two features for the PCell time alignment timer, which are "to expire" and "to stop." When the time alignment timer (TAT) of a PCell 719 expires, the UE 702 may flush all HARQ buffers and may notify radio resource control (RRC) to release a physical uplink control channel (PUCCH) and/or sounding reference signal (SRS). Furthermore, the UE may clear any configured downlink assignments and uplink grants in this case. This may be done as was described above. However, when the PCell time alignment timer is stopped due to an unsuccessful random access procedure (e.g., due to an unsuccessful contention resolution), the UE 702 may perform an operation based on an SCell time alignment timer. Examples of these operations are described above in connection with FIG. 5 and FIG. 6. FIG. 8 below gives an example that provides additional context on how an unsuccessful random access procedure (e.g., unsuccessful contention resolution) may occur.

FIG. 8 is a flow diagram illustrating one example of a method 800 for handling a random access response. In particular, FIG. 8 illustrates a case where a UE 102 receives an uplink grant in a random access response. After a UE 102 sends a random access preamble, for instance, an eNB 160 may send a timing advance command and an uplink grant value in a random access response message, which may be received by the UE 102. If a random access preamble is selected by a UE MAC, this may be referred to as contention based random access. If a random access preamble is not selected by a UE MAC (e.g., the random access preamble index is signaled by an eNB 160), this may be referred to as non-contention based random access or contention-free random access.

For a contention based random access procedure, the UE 102 may transmit a message (e.g., Msg3) and receive a contention resolution. For a non-contention based random access procedure, at the successful reception of a random access response message, the procedure may be successfully completed and the UE 102 may perform a normal uplink transmission based on the uplink grant in the random access response.

For a contention based random access procedure, if it is a first successfully received random access response within a random access procedure, the UE 102 may indicate to the multiplexing and assembly entity or module 136 to include a cell radio network temporary identifier (C-RNTI) MAC control element in a subsequent uplink transmission. Furthermore, the UE 102 may obtain a MAC PDU to transmit from the multiplexing and assembly entity or module 136 and store it in an Msg3 buffer 134. A message (e.g., Msg3) stored in the Msg3 buffer 134 may be used for a next random access attempt even if the random access preamble is retransmitted due to an unsuccessful contention resolution or unsuccessful reception of the random access response message.

In some configurations, the UE 102 may function as follows. The UE 102 may receive 802 an uplink grant in a random access response. The UE 102 may determine 804 whether the uplink grant is a first successfully received random access response within a random access procedure, whether a MAC PDU is in the Msg3 buffer 134 or otherwise.

If the uplink grant is a first successfully received random access response within a random access procedure, the UE 102 may indicate 808 to the multiplexing and assembly entity or module 136 to include a C-RNTI MAC control element in a subsequent uplink transmission. Furthermore, the UE 102 may obtain 810 a MAC PDU to transmit from the multiplexing and assembly entity or module 136 and store 812 it in the Msg3 buffer 134. The UE 102 may then transmit 814 the MAC PDU (e.g., Msg3).

If there is a MAC PDU in the Msg3 buffer 134, the UE 102 may obtain 806 the MAC PDU to transmit from the Msg3 buffer 134 (for contention based random access, for example). The UE 102 may then transmit 814 the MAC PDU (e.g., Msg3). In some cases, the UE 102 may transmit 814 the MAC PDU in a HARQ procedure based on the uplink grant. Otherwise, the UE 102 may obtain 810 the MAC PDU to transmit from the multiplexing and assembly entity or module 136 (for non-contention based random access, for example). It should be noted that a MAC PDU (e.g., Msg3) may be transmitted 814 in a hybrid automatic repeat request (HARQ) procedure based on an uplink grant in some cases.

Upon transmitting 814 the MAC PDU, the UE 102 may start 816 a "mac-ContentionResolutionTimer" (e.g., contention resolution timer). The UE may additionally restart 816 the mac-ContentionResolutionTimer at each HARQ retransmission, if any.

The UE 102 may determine 818 whether it 102 has received a PDCCH for contention resolution. If the UE 102 receives a PDCCH that is used for contention resolution, the UE 102 may deem 820 the contention resolution successful, stop 822 the mac-ContentionResolutionTimer and deem 824 the random access procedure successfully completed.

If the UE 102 has not received a PDCCH for contention resolution, the UE 102 may determine 826 whether the mac-ContentionResolutionTimer is expired. If the mac-ContentionResolutionTimer is not expired, the UE 102 may return to determine 818 if a PDCCH is received for contention resolution. If the mac-ContentionResolutionTimer expires, the UE 102 may deem 828 the contention resolution (e.g., random access procedure) unsuccessful. When the contention resolution (e.g., random access procedure) is deemed 828 unsuccessful, the UE 102 may stop 830 a time alignment timer for a cell (e.g., PCell or SCell corresponding to the uplink grant).

In the case where the PCell time alignment timer is stopped 830 due to an unsuccessful random access procedure or unsuccessful contention resolution, the UE 102 may perform an operation based on an SCell time alignment timer. For example, the UE 102 may perform one or more of the operations described in connection with FIG. 5 or FIG. 6.

Figure 9:
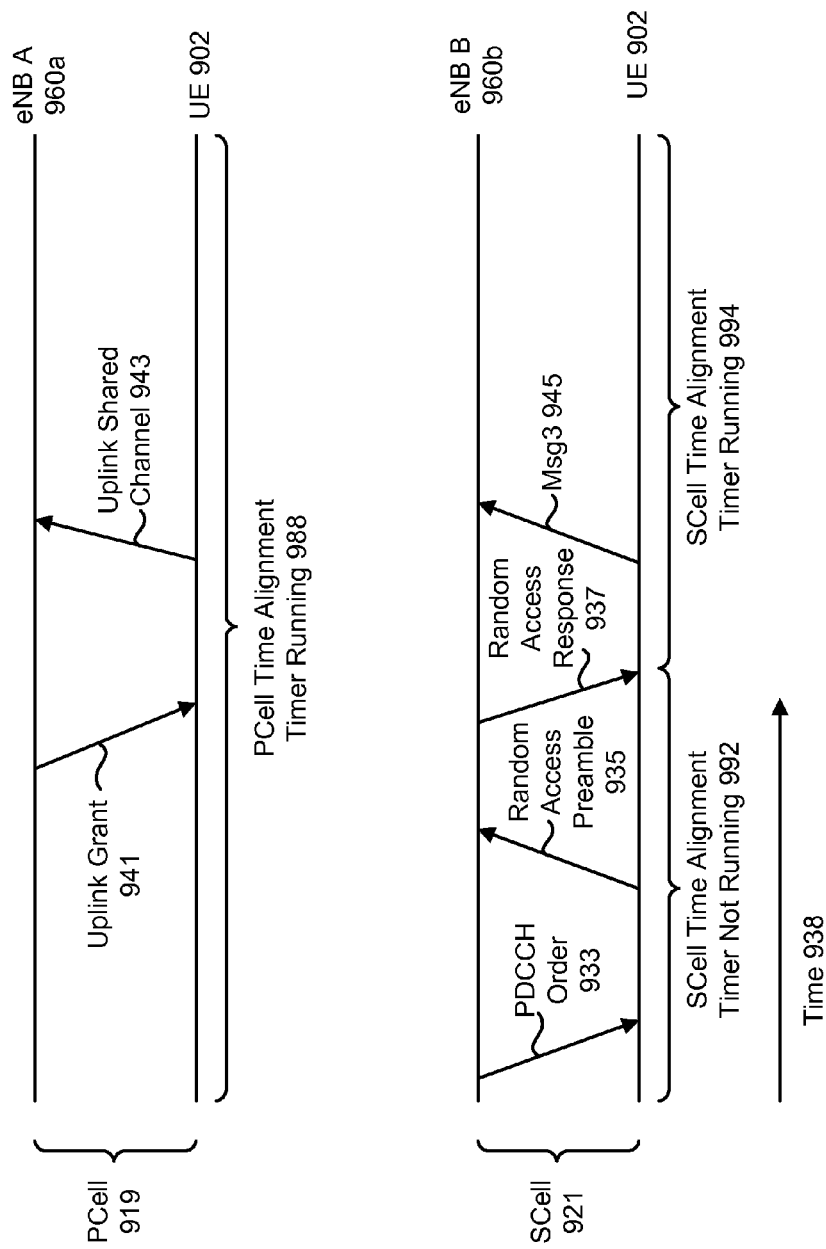
FIG. 9 is a diagram illustrating one example of primary cell (PCell) activities and secondary cell (SCell) activities on a user equipment (UE) over time.

FIG. 9 is a diagram illustrating one example of PCell 919 activities and SCell 921 activities on a UE 902 over time 938. In this example, a PCell time alignment timer is running 988 initially and an SCell time alignment timer is not running 992 initially. The UE 902 may communicate with one or more eNBs 960a-b. It should be noted that eNB A 960a and eNB B 960b may be the same eNB or may be different eNBs. The UE 902 may receive an uplink grant 941 from eNB A 960*a* in a PCell 919. The UE 902 may then transmit data to eNB A 960*a* using an uplink shared channel 943.

In this example, an SCell time alignment timer is not running 992 initially on the UE 902. The UE 902 receives a PDCCH order 933 in an SCell 921 from eNB B 960*b* to begin a random access procedure. Accordingly, the UE 902 may send a random access preamble 935 to eNB B 960*b*. Upon receiving a random access response 937 from eNB B 960*b*, the UE 902 may start the SCell time alignment timer such that the SCell time alignment timer is running 994. The UE 902 may then transmit a Msg3 945 to eNB B 960*b*.

As illustrated in the example shown in FIG. 9, eNB B 960*b* may request to initiate a random access procedure in an SCell 921 during an ongoing uplink transmission in a PCell 919. Traditionally, the Msg3 buffer of a PCell may at least have a cell radio network temporary identifier (C-RNTI) MAC control element and may possibly have one or more other MAC control elements and one or more MAC service data units SDU(s). Because uplink transmission in a PCell may be resumed after a successful random access (RA) procedure in Release-10, there was no problem for handling MAC SDU(s) in one time alignment in Release-10.

However, if a UE 902 performs a contention based random access procedure in an SCell 921 and fails a random access (RA) procedure (e.g., an unsuccessful random access procedure occurs), this may cause a significant delay of MAC SDU(s) transmission compared with a normal uplink transmission in a PCell 919. Therefore, it may be better to not have MAC SDU(s) in a Msg3 buffer for an SCell 921. Thus, the multiplexing and assembly entity or module in a UE MAC may not include any MAC SDU(s) in a MAC PDU to be transmitted in an Msg3 buffer for the SCell 921.

Figure 10:
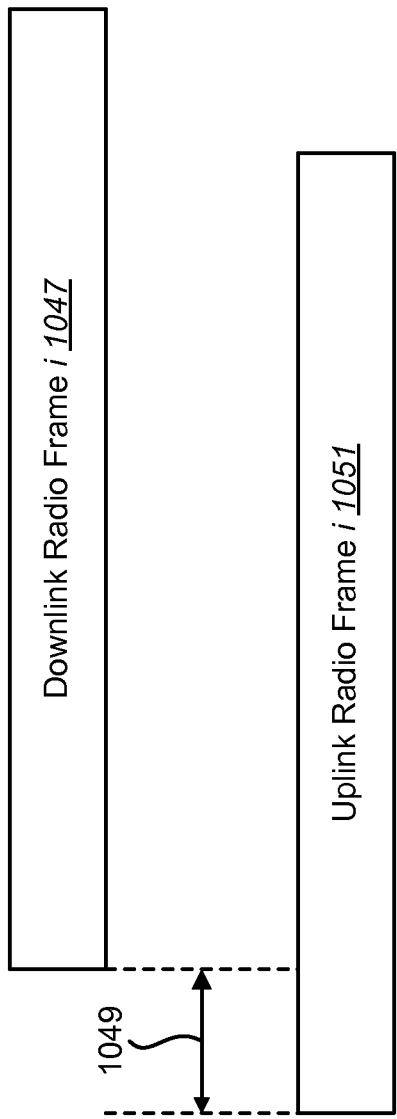
FIG. 10 is a diagram illustrating one example of uplink transmission timing.

FIG. 10 is a diagram illustrating one example of uplink transmission timing. Transmission of an uplink radio frame number i 1051 from the UE 102 may start $N_{TA} \times T_s$ seconds 1049 before the start of a corresponding downlink radio frame i 1047 at the UE 102, where $0 \leq N_{TA} \leq 20512$ and $$T_s = \frac{1}{(15000 \times 2048)}$$

seconds. In other words, a UE 102 may begin transmitting an uplink radio frame i 1051 $N_{TA} \times T_s$ seconds 1049 before receiving a corresponding downlink radio frame i 1047. A timing advance command received by the UE 102 may be used to adjust uplink transmission timing.

Figure 11:
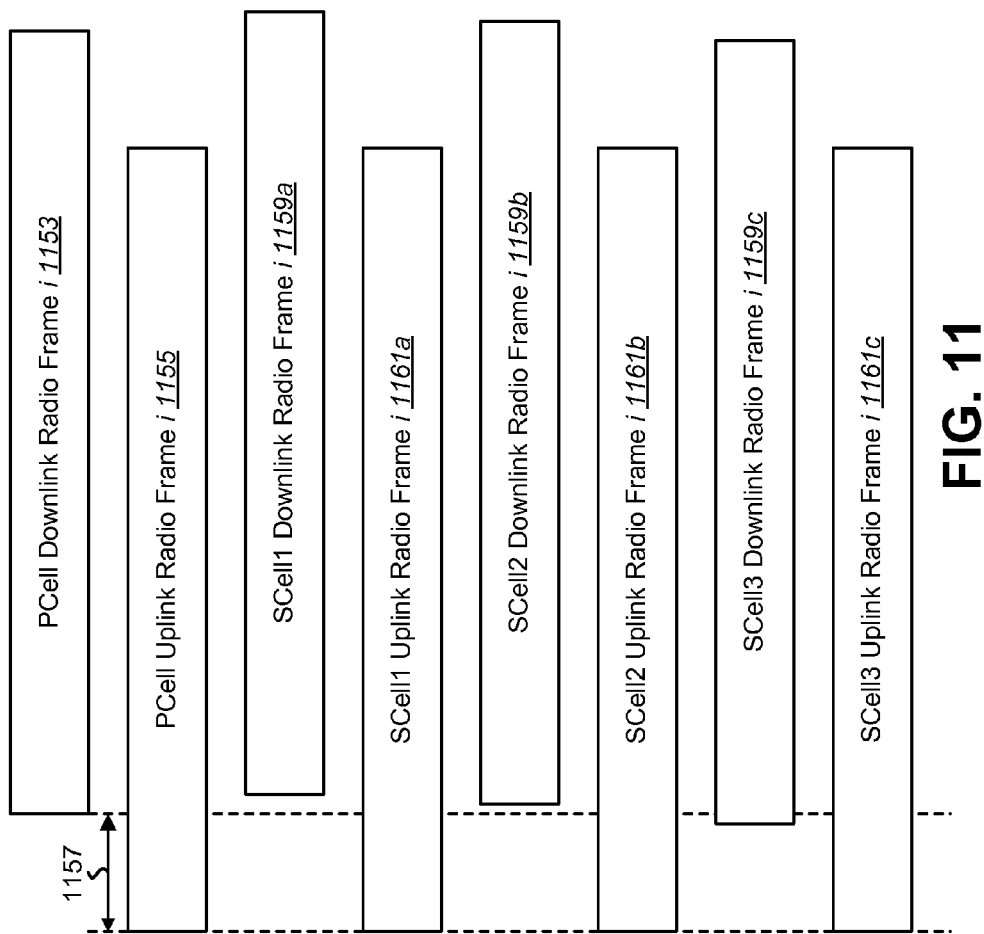
FIG. 11 is a diagram illustrating another example of uplink transmission timing.

FIG. 11 is a diagram illustrating another example of uplink transmission timing. The uplink transmission timing of one or more SCells 121 (e.g., for PUSCH and/or SRS) is the same as the PCell 119. As illustrated in FIG. 11, the transmission of a PCell uplink radio frame number i 1155 from the UE 102 may start $N_{TA} \times T_s$ seconds 1157 before the start of a corresponding PCell downlink radio frame i 1153 at the UE 102. The transmission of one or more SCell uplink radio frames number i 1161*a-c* from the UE 102 may start $N_{TA} \times T_s$ seconds 1157 before the start of the PCell downlink radio frame i 1153 at the UE 102. As can be observed in FIG. 11, downlink radio frames number 1159*a-c* may vary in timing. It should be noted that uplink transmission timing for other SCells 121 (in other groups, for example) may be based on the transmission timing for a designated SCell 121.

Figure 12:
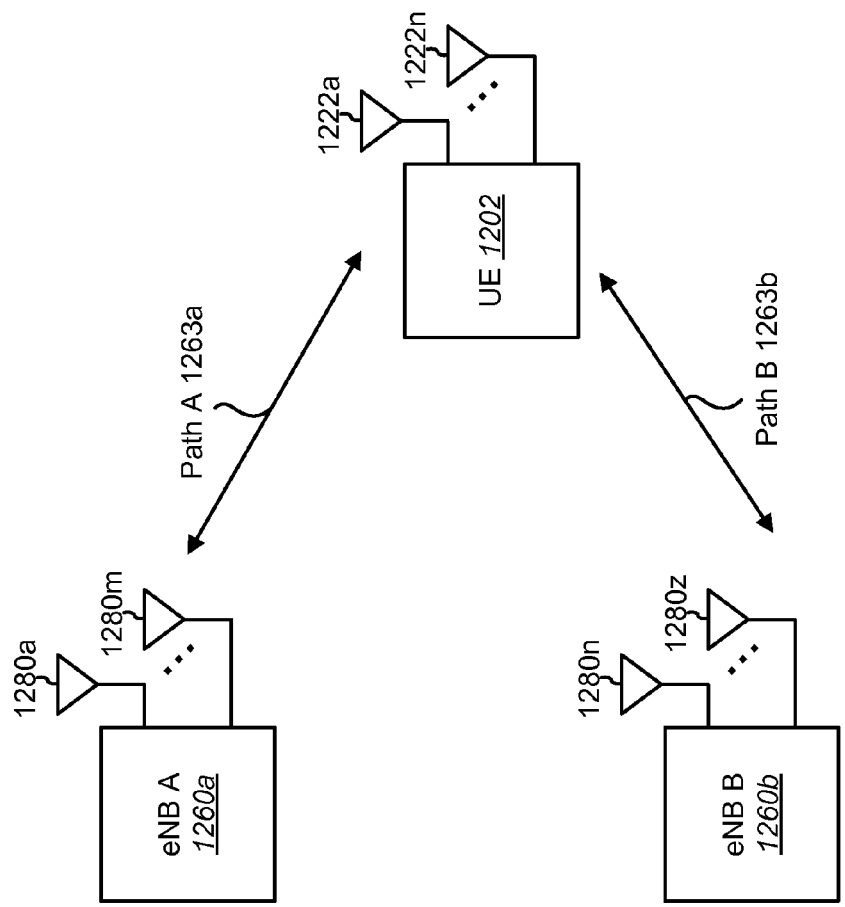
FIG. 12 is a block diagram illustrating one example of a deployment scenario.

FIG. 12 is a block diagram illustrating one example of a deployment scenario. In this example, two eNBs 1260*a-b* may both communicate with a UE 1202. eNB A 1260*a* may include one or more antennas 1280*a-m* for communicating with the UE 1202. eNB B 1260*b* may include one or more antennas 1280*n-z* for communicating with the UE 1202. The UE 1202 may include antennas 1222*a-n* for communicating with eNB A 1260*a* and eNB B 1260*b*. In this example, the UE 1202 may communicate with two non-collocated sites (e.g., eNBs 1260*a-b*) on multiple carriers. As can be observed, each communication path 1263*a-b* may experience different propagation environments. This may lead to differences in uplink transmission timing for communication frames on path A 1263*a* and path B 1263*b*. In one configuration, one group of cells or channels may be established on path A 1263*a*, while another group of cells or channels may be established on path B 1263*b*. The scenario illustrated in FIG. 12 could similarly occur with remote antennas or remote radio heads.

Figure 13:
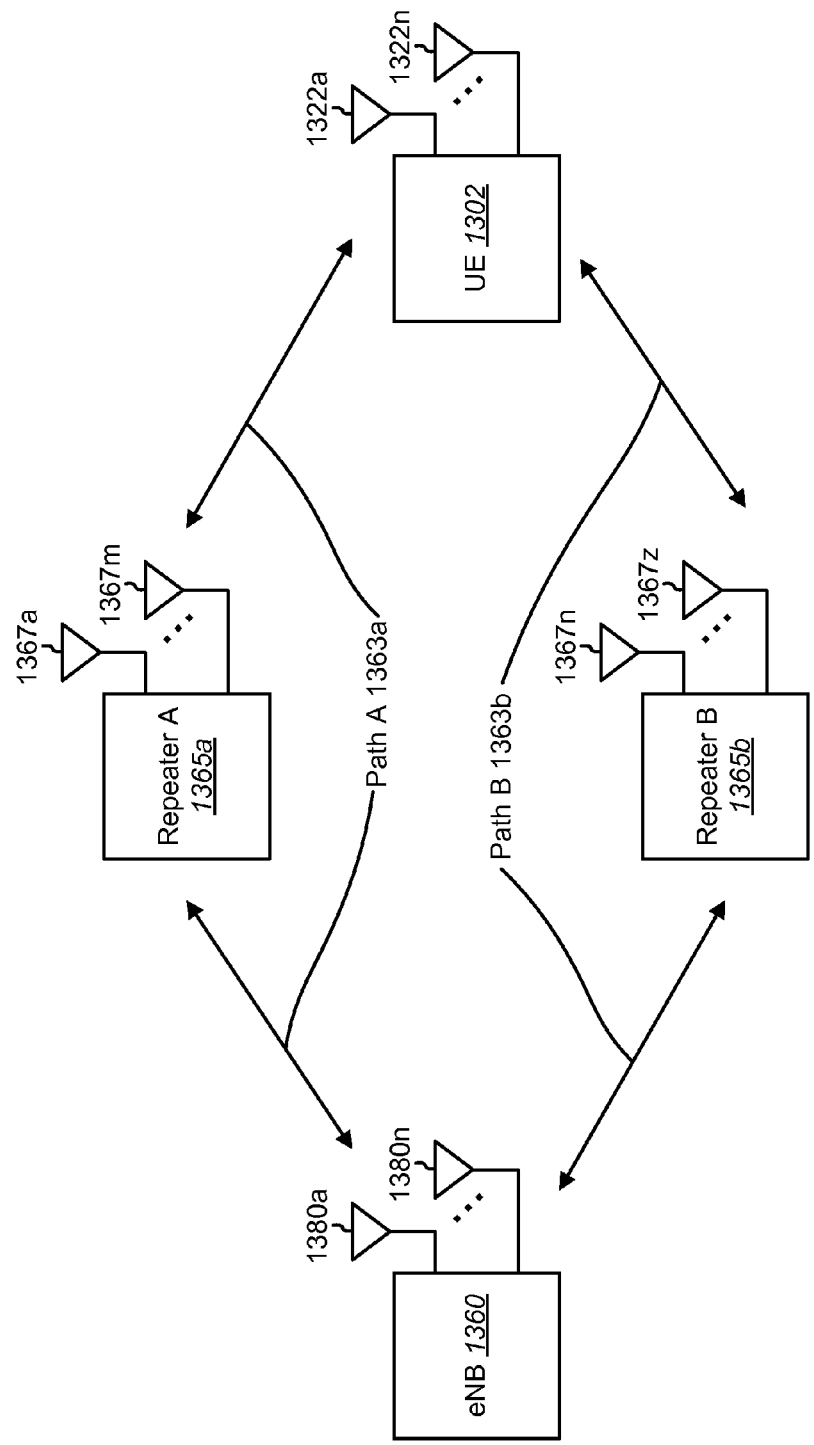
FIG. 13 is a block diagram illustrating another example of a deployment scenario.

FIG. 13 is a block diagram illustrating another example of a deployment scenario. In this example, an eNB 1360 may communicate with a UE 1302 using multiple signals. The eNB 1360 may include one or more antennas 1380*a-n* for communicating with the UE 1302 via repeaters A and B 1365*a-b*. Repeater A 1365*a* may include one or more antennas 1367*a-m* for communicating with the eNB 1360 and/or the UE 1302. Repeater B 1365*b* may include one or more antennas 1367*n-z* for communicating with the eNB 1360 and/or the UE 1302. The UE 1302 may include antennas 1322*a-n* for communicating with the eNB 1360 via repeaters A and B 1365*a-b*. In this example, the UE 1302 may communicate with the eNB 1360 over paths A and B 1363*a-b*. As can be observed, each communication path 1363*a-b* may experience different propagation environments. This may lead to differences in uplink transmission timing for communication frames on path A 1363*a* and path B 1363*b*. For example, different component carriers could see substantially different propagation environments between path A 1363*a* and path B 1363*b* due to different frequency-selective repeaters 1365*a-b* and hence experience different time-of-flights. In one configuration, one group of cells or channels may be established on path A 1363*a*, while another group of cells or channels may be established on path B 1363*b*.

Figure 14:
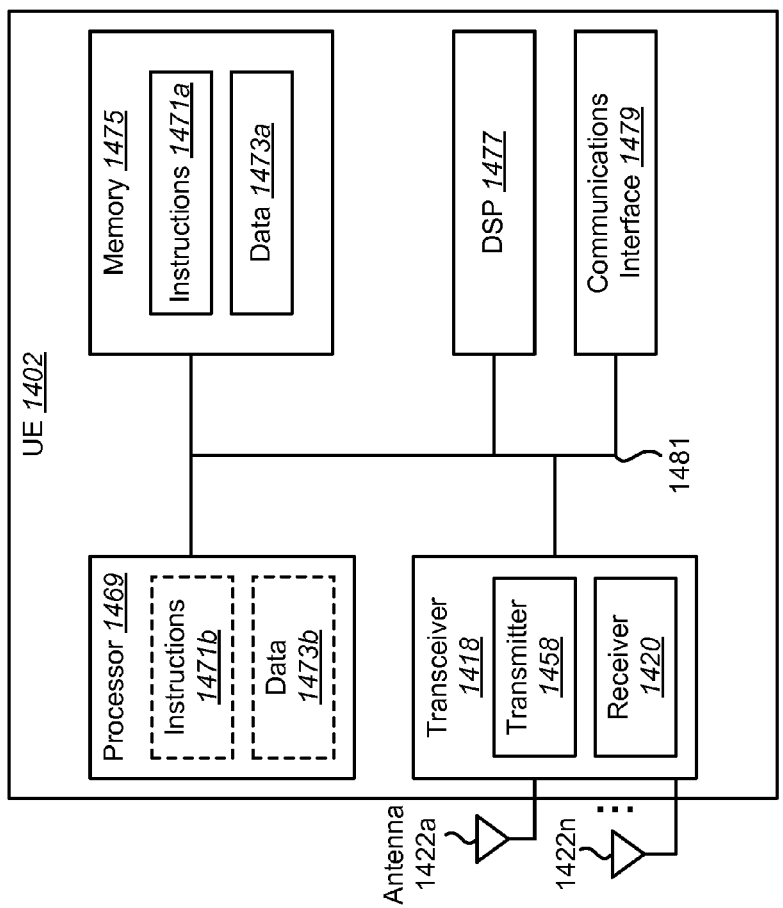
FIG. 14 illustrates various components that may be utilized in a user equipment (UE)

FIG. 14 illustrates various components that may be utilized in a user equipment (UE) 1402. The UE 1402 may be utilized as one or more of the UEs 102, 302, 702, 902, 1202, 1302 described above. The UE 1402 includes a processor 1469 that controls operation of the UE 1402. The processor 1469 may also be referred to as a CPU. Memory 1475, which may include read-only memory (ROM), random access memory (RAM), a combination of the two or any type of device that may store information, provides instructions 1471*a* and data 1473*a* to the processor 1469. A portion of the memory 1475 may also include non-volatile random access memory (NVRAM). Instructions 1471*b* and data 1473*b* may also reside in the processor 1469. Instructions 1471*b* and/or data 1473*b* loaded into the processor 1469 may also include instructions 1471*a* and/or data 1473*a* from memory 1475 that were loaded for execution or processing by the processor 1469. The instructions 1471*b* may be executed by the processor 1469 to implement the systems and methods disclosed herein.

The UE 1402 may also include a housing that contains one or more transmitters 1458 and one or more receivers 1420 to allow transmission and reception of data. The transmitter(s) 1458 and receiver(s) 1420 may be combined into one or more transceivers 1418. One or more antennas 1422*a-n* are attached to the housing and electrically coupled to the transceiver 1418.

The various components of the UE 1402 are coupled together by a bus system 1481, which may include a power bus, a control signal bus and a status signal bus, in addition to a data bus. However, for the sake of clarity, the various buses are illustrated in FIG. 14 as the bus system 1481. The UE 1402 may also include a digital signal processor (DSP) 1477 for use in processing signals. The UE 1402 may also include a communications interface 1479 that provides user access to the functions of the UE 1402. The UE 1402 illustrated in FIG. 14 is a functional block diagram rather than a listing of specific components.

Figure 15:
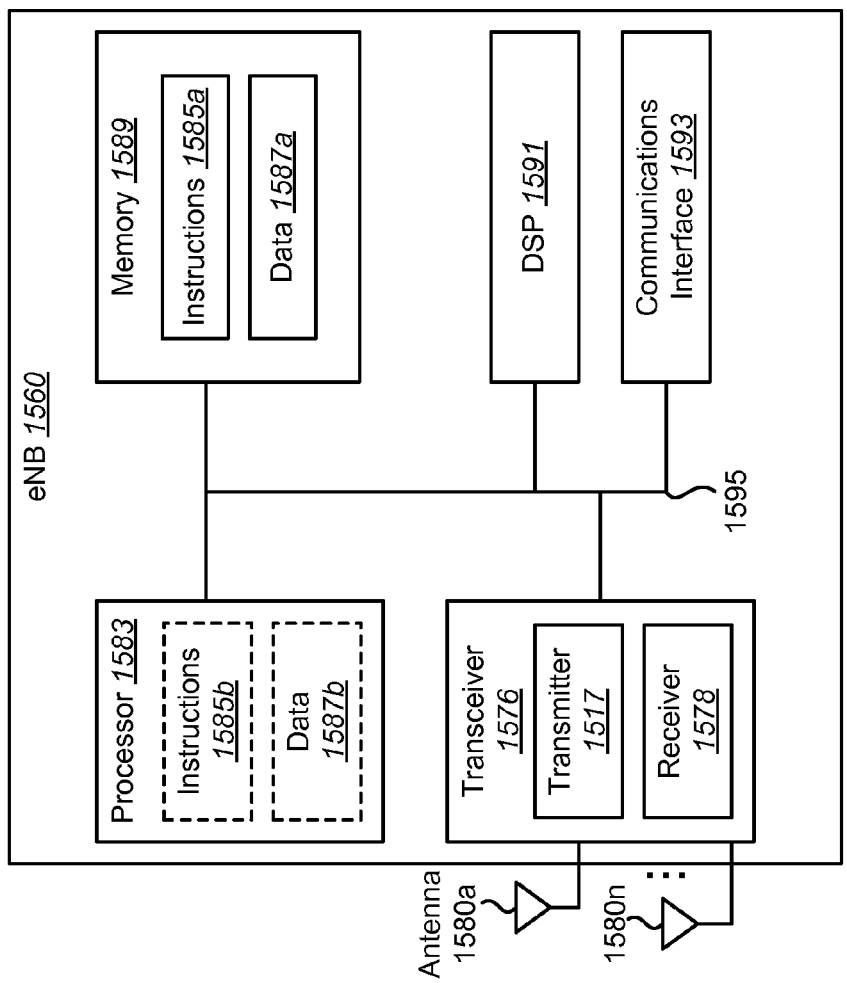
FIG. 15 illustrates various components that may be utilized in an evolved Node B (eNB).

FIG. 15 illustrates various components that may be utilized in an evolved Node B (eNB) 1560. The eNB 1560 may be utilized as one or more of the eNBs 160, 360, 760, 960, 1260, 1360 described previously. The eNB 1560 may include components that are similar to the components discussed above in relation to the UE 1402, including a processor 1583, memory 1589 that provides instructions 1585a and data 1587a to the processor 1583, instructions 1585b and data 1587b that may reside in or be loaded into the processor 1583, a housing that contains one or more transmitters 1517 and one or more receivers 1578 (which may be combined into one or more transceivers 1576), one or more antennas 1580a-n electrically coupled to the transceiver(s) 1576, a bus system 1595, a DSP 1591 for use in processing signals, a communications interface 1593 and so forth.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) configured for multi-cell communications, comprising:
   a processor;
   memory in electronic communication with the processor;
   instructions stored in the memory, the instructions being executable to:
   set multiple uplink time alignment timers for UE to have different uplink transmission timings for each group, wherein the multiple uplink time alignment timers are constituted by (i) a primary cell (PCell) time alignment timer for a group including at least a PCell and (ii) one or more secondary cell (SCell) time alignment timers for one or more groups including one or more SCells, and wherein each group shares a same uplink transmission timing;
   determine whether the PCell time alignment timer is expired; and
   when the PCell time alignment timer expires: (i) set all the SCell time alignment timers as expired without releasing the SCell time alignment timers, and (ii) flush all hybrid automatic repeat request (HARQ) buffers,
   wherein in a case that the SCell time alignment timer expires, all HARQ buffers for the SCell are flushed,
   wherein each time alignment timer is started or restarted in a case when a corresponding timing advance command is received, and
   wherein each of the one or more SCell time alignment timers has an expiry value signaled independently from an expiry value of the PCell time alignment timer.

2. The UE of claim 1, wherein the SCell time alignment timer has an expiry value of infinity.

3. The UE of claim 1, wherein the instructions are further executable to determine whether the PCell time alignment timer is stopped due to an unsuccessful random access procedure.

4. The UE of claim 3, wherein if the PCell time alignment timer is stopped due to an unsuccessful random access procedure, the instructions are further executable to maintain the one or more SCell time alignment timers.

5. The UE of claim 3, wherein if the PCell time alignment timer is stopped due to an unsuccessful random access procedure, the instructions are further executable to stop the one or more SCell time alignment timers.

6. A method for enabling multi-cell communications on a user equipment (UE), comprising:
   setting multiple uplink time alignment timers for UE to have different uplink transmission timings for each group, wherein the multiple uplink time alignment timers are constituted by (i) a primary cell (PCell) time alignment timer for a group including at least a PCell and (ii) one or more secondary cell (SCell) time alignment timers for one or more groups including one or more SCells, and wherein each group shares a same uplink transmission timing;
   determining whether the PCell time alignment timer is expired; and
   when the PCell time alignment timer expires: (i) setting all the SCell time alignment timers as expired without releasing the SCell time alignment timers, and (ii) flush all hybrid automatic repeat request (HARQ) buffers,
   wherein in a case that the SCell time alignment timer expires, all HARQ buffers for the SCell are flushed,
   wherein each time alignment timer is started or restarted in a case when a corresponding timing advance command is received; and wherein each of the one or more SCell time alignment timers has an expiry value signaled independently from an expiry value of the PCell time alignment timer.

7. The method of claim 6, wherein the S Cell time alignment timer has an expiry value of infinity.

8. The method of claim 6, further comprising determining whether the PCell time alignment timer is stopped due to an unsuccessful random access procedure.

9. The method of claim 8, wherein if the PCell time alignment timer is stopped due to an unsuccessful random access procedure, the method further comprises maintaining the one or more SCell time alignment timers.

10. The method of claim 8, wherein if the PCell time alignment timer is stopped due to an unsuccessful random access procedure, the method further comprises stopping the one or more SCell time alignment timers.

11. A non-transitory, tangible computer-readable medium for enabling multi-cell communications on a user equipment (UE), comprising executable instructions for:
　　setting multiple uplink time alignment timers for UE to have different uplink transmission timings for each group, wherein the multiple uplink time alignment timers are constituted by (i) a primary cell (PCell) time alignment timer for a group including a PCell and (ii) one or more secondary cell (SCell) time alignment timers for one or more groups including one or more SCells, and wherein each group shares a same uplink transmission timing;
　　determining whether the PCell time alignment timer is expired; and
　　when the PCell time alignment timer expires: (i) setting all the SCell time alignment timers as expired without releasing the SCell time alignment timers, and (ii) flush all hybrid automatic repeat request (HARQ) buffers,
　　wherein in a case that the SCell time alignment timer expires, all HARQ buffers for the SCell are flushed,
　　wherein each time alignment timer is started or restarted in a case a corresponding timing advance command is received, and
　　wherein each of the one or more SCell time alignment timers has an expiry value signaled independently from an expiry value of the PCell time alignment timer.

12. The computer-readable medium of claim 11, wherein the SCell time alignment timer has an expiry value of infinity.

13. The computer-readable medium of claim 11, further comprising executable instructions for determining whether the PCell time alignment timer is stopped due to an unsuccessful random access procedure.

14. A user equipment (UE) configured for multi-cell communications, comprising:
　　a primary cell (PCell) time alignment timer;
　　one or more secondary cell (SCell) time alignment timers;
　　an operation circuitry configured or programmed to:
　　set multiple uplink time alignment timers for UE to have different uplink transmission timings for each group, wherein the multiple uplink time alignment timers are constituted by (i) the primary cell (PCell) time alignment timer for a group including at least a PCell and (ii) the one or more secondary cell (SCell) time alignment timers for one or more groups including one or more SCells, and wherein each group shares a same uplink transmission timing;
　　determine whether the PCell time alignment timer is expired; and
　　when the PCell time alignment timer expires: (i) set all the SCell time alignment timers as expired without releasing the SCell time alignment timers, and (ii) flush all hybrid automatic repeat request (HARQ) buffers,
　　wherein in a case that the SCell time alignment timer expires, all HARQ buffers for the SCell are flushed,
　　wherein each time alignment timer is started or restarted in a case when a corresponding timing advance command is received, and
　　wherein each of the one or more SCell time alignment timers has an expiry value signaled independently from an expiry value of the PCell time alignment timer.

* * * * *